(12) United States Patent
Falster et al.

(10) Patent No.: US 9,365,140 B2
(45) Date of Patent: *Jun. 14, 2016

(54) HEADREST SYSTEM AND METHOD OF ADJUSTING A HEADREST

(71) Applicant: Schukra Gerätebau GmbH, Berndorf (AT)

(72) Inventors: Frank Falster, Nuremberg (DE); Klaus Junker, Diessen am Ammersee (DE); Gunter Maierhofer, Veitsbronn (DE); Jürgen Wanke, Nuremberg (DE)

(73) Assignee: Schukra Geraetebau GmbH, Berndorf (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,209

(22) PCT Filed: Aug. 13, 2013

(86) PCT No.: PCT/EP2013/066901
§ 371 (c)(1),
(2) Date: Feb. 12, 2015

(87) PCT Pub. No.: WO2014/026982
PCT Pub. Date: Feb. 20, 2014

(65) Prior Publication Data
US 2015/0203007 A1 Jul. 23, 2015

(30) Foreign Application Priority Data

Aug. 13, 2012 (EP) .................................... 12005854
Sep. 21, 2012 (EP) .................................... 12185473

(51) Int. Cl.
*A47C 1/10* (2006.01)
*A47C 7/36* (2006.01)
(Continued)

(52) U.S. Cl.
CPC .............. *B60N 2/4805* (2013.01); *B60N 2/482* (2013.01); *B60N 2/4829* (2013.01);
(Continued)

(58) Field of Classification Search
CPC .. B60N 2/4829; B60N 2/4805; B60N 2/4817; B60N 2/482; B60N 2/4864; B60N 2/0224; B60N 2/48; B60N 2/4852; B60N 2/0232
USPC ............. 297/400, 391, 410, 216.12, 408, 402
See application file for complete search history.

(56) References Cited

U.S. PATENT DOCUMENTS 4,193,631 A * 3/1980 Hobley ................ B60N 2/4847
297/408
4,222,608 A 9/1980 Maeda
(Continued)

FOREIGN PATENT DOCUMENTS

DE 197 817 82 B4 7/2007
DE 10 2008 060 641 A1 6/2009
(Continued)

OTHER PUBLICATIONS

European Search Report and Search Opinion, received in European Patent Application No. 12005854.0, dated Jan. 18, 2013 (6 pages).
(Continued)

*Primary Examiner* — Chi Q Nguyen
(74) *Attorney, Agent, or Firm* — Michael Best & Friedrich LLP

(57) ABSTRACT

A headrest system comprises a headrest, a bracket to which the headrest is mounted and an actuator. The actuator is configured to displace at least a portion of the headrest relative to the bracket in a displacement direction which is transverse to a longitudinal member of the bracket. The actuator comprises a spindle transmission and a power drive coupled to the spindle transmission. The spindle transmission comprises a spindle and a spindle nut engaged with the spindle. The power drive is arranged in a cavity defined within an outer shell of the headrest.

15 Claims, 11 Drawing Sheets

(51) Int. Cl.
*A61G 15/00* (2006.01)
*B60R 22/28* (2006.01)
*B60N 2/48* (2006.01)
*B60N 2/02* (2006.01)

(52) U.S. Cl.
CPC .......... *B60N 2/4864* (2013.01); *B60N 2/4882* (2013.01); *B60N 2/0224* (2013.01); *B60N 2/0232* (2013.01); *B60N 2/48* (2013.01); *B60N 2/4817* (2013.01); *B60N 2/4852* (2013.01); *B60N 2002/4894* (2013.01); *B60N 2002/4897* (2013.01)

(56) References Cited

U.S. PATENT DOCUMENTS

| | | | |
|---|---|---|---|
| 4,466,663 A | | 8/1984 | Oishi |
| 4,668,014 A | | 5/1987 | Boisset |
| 4,923,250 A | | 5/1990 | Hattori |
| 5,011,225 A | | 4/1991 | Nemoto |
| 5,103,691 A | | 4/1992 | Periou |
| 5,222,784 A | | 6/1993 | Hamelin |
| 5,669,666 A | | 9/1997 | Lee |
| 5,992,937 A | * | 11/1999 | Pilhall ................ B60N 2/4847 297/408 |
| 6,088,640 A | | 7/2000 | Breed |
| 6,352,285 B1 | * | 3/2002 | Schulte ............... B60N 2/4876 280/751 |
| 7,232,187 B1 | | 6/2007 | Sundararajan |
| 7,523,987 B2 | * | 4/2009 | Yamaguchi .......... B60N 2/4228 297/216.12 |
| 7,543,888 B2 | | 6/2009 | Kuno |
| 7,588,115 B2 | * | 9/2009 | Breed ................. B60N 2/0232 180/271 |
| 7,871,129 B2 | | 1/2011 | Boes |
| 7,878,597 B2 | | 2/2011 | Bokelmann |
| 7,946,653 B2 | | 5/2011 | Robert |
| 8,020,935 B2 | | 9/2011 | Becker |
| 8,038,219 B2 | | 10/2011 | Boes |
| 8,272,696 B2 | | 9/2012 | Hong |
| 8,573,702 B2 | | 11/2013 | Tscherbner |
| 8,657,378 B2 | | 2/2014 | Kunert |
| 8,899,685 B2 | | 12/2014 | Haeske |
| 8,939,512 B2 | | 1/2015 | Boes |
| 2001/0028191 A1 | | 10/2001 | Lance |
| 2002/0043860 A1 | * | 4/2002 | Dinkel ................ B60N 2/4808 297/410 |
| 2004/0195894 A1 | | 10/2004 | Pal |
| 2006/0273636 A1 | * | 12/2006 | Sugimoto ............ B60N 2/4214 297/216.12 |
| 2007/0145803 A1 | * | 6/2007 | Kopetzky ................ A47C 7/38 297/410 |
| 2007/0296260 A1 | * | 12/2007 | Stossel ..................... B60N 2/20 297/408 |
| 2009/0152925 A1 | | 6/2009 | Kim |
| 2010/0045090 A1 | | 2/2010 | Brunner |
| 2012/0112510 A1 | * | 5/2012 | Ishimoto ............. B60N 2/4228 297/408 |

FOREIGN PATENT DOCUMENTS

| | | |
|---|---|---|
| DE | 10 2009 016 835 A1 | 10/2010 |
| EP | 0 011 009 A1 | 5/1980 |
| EP | 1 123 831 A1 | 8/2001 |
| WO | 00/07841 | 2/2000 |

OTHER PUBLICATIONS

European Search Report and Search Opinion, received in European Patent Application No. 12185473.1, dated Jan. 17, 2013 (6 pages).
International Search Report and Written Opinion, received in International Patent Application No. PCT/EP2013/066901, dated Sep. 30, 2013 (10 pages).

* cited by examiner

HEADREST SYSTEM AND METHOD OF ADJUSTING A HEADREST

TECHNICAL FIELD

Embodiments of the invention relate to a headrest system and to a method of adjusting a headrest. Embodiments of the invention relate in particular to a headrest which can be adjusted using a power drive.

BACKGROUND

A wide variety of seats is provided with headrests. For enhanced comfort or security reasons, the headrest may be adjustable. An adjusting mechanism may be provided which displaces a front surface of the headrest towards or away from the seat occupant. Simple mechanical mechanisms which require the user to manually adjust the headrest to a desired location may be used in some applications. However, in many cases, it is desirable that the headrest can be displaced in an automated manner.

Automated headrest adjusting mechanisms may be based on a pneumatic adjustment. However, a significant amount of tubing may be required for inflating and deflating inflatable bladders. To avoid such shortcomings, automated headrest adjusting mechanisms may include a motor and a mechanical transmission. Conventional headrest adjusting mechanisms have been designed such that the motor which ultimately drives the headrest displacement is located in the backrest of the seat. In such a configuration, installation space must be reserved in the backrest for installing the motor and, possibly, also the transmission in the backrest. This may be undesirable. For illustration, with an increasing number of functions which is integrated into modern vehicle seats, installation space may become an issue. Further, in conventional approaches, the design of the backrest and the design of the headrest mounted thereto must be specified to such an extent that interoperability can be ensured between the drive mechanism for headrest adjustment and the headrest that will be used. This may give rise to design limitations, for illustration in terms of interchangeability of components. Attaching the headrest to the seat may require dedicated working steps for coupling the drive mechanism to the headrest, which may add to costs.

SUMMARY OF THE INVENTION

There is a need in the art for an improved adjusting mechanism for a headrest. In particular, there is a need in the art for a headrest system and method which provide advantages in terms of installation space requirements for an adjusting mechanism. There is also a need for a headrest system and method that allow an adjustable headrest to be easily attached to a seat backrest, for example to a vehicle seat backrest.

According to embodiments of the invention, a headrest system and a method of adjusting a headrest as defined in the independent claims are provided. Further, a seat comprising a headrest system and an actuator are provided. The dependent claims define embodiments.

A headrest system according to an embodiment comprises a headrest, a bracket, and an actuator. The bracket has a longitudinal member for mounting the headrest to a backrest of a seat. The actuator is configured to displace at least a portion of the headrest relative to the bracket in a displacement direction arranged at an angle relative to the longitudinal member. The actuator comprises a spindle transmission and a power drive coupled to the spindle transmission. The spindle transmission comprises a spindle and a spindle nut engaged with the spindle. The power drive is arranged in a cavity defined within an outer shell of the headrest.

By using an actuator to displace at least a part of the headrest in a displacement direction which is angled relative to the longitudinal member of the mounting bracket, i.e. which is not parallel to the longitudinal member of the mounting bracket, the headrest can be adjusted in directions towards or away from the seat occupant and/or in lateral directions. With the power drive being arranged in a cavity within the headrest, the installation space required in a backrest of a seat may be reduced. By using a spindle transmission that is driven by the power drive, an actuator which converts the rotating output movement of the motor to a linear movement and which provides sufficient adjustment forces may be configured to have a small construction space, allowing it to be mounted within the headrest.

The spindle and the spindle nut may also be arranged in the cavity. The full actuator may be integrated into the headrest. The actuator may be enclosed by an outer shell of the headrest. The headrest system may be configured such that the power drive, the spindle and the spindle nut may be located within the cavity for any position of the headrest relative to the bracket.

The actuator may be configured to displace at least a portion of the headrest in a direction transverse to the longitudinal member. The actuator may be configured to displace at least a portion of the headrest in a direction perpendicular to the longitudinal member. The actuator may be configured to displace a rigid shell portion of the headrest in a translatory manner. The actuator may be configured to displace a front cover of the headrest or portions of the front cover along a two-dimensional curve, to thereby adjust a curvature of the front cover or a side support provided by the headrest.

The spindle may be arranged in the cavity such that a longitudinal axis of the spindle is transverse to the displacement direction. The longitudinal axis of the spindle may be perpendicular to the displacement direction and perpendicular to the longitudinal member. The spindle may be integrated into the headrest such that, when the headrest is mounted to a seat, the spindle extends horizontally.

The actuator may comprise a second spindle transmission. The second spindle transmission may comprise a second spindle nut.

The actuator may comprise a speed reduction mechanism which has at least one drive member which is rotatably mounted. The actuator may be configured such that both the spindle transmission and the second spindle transmission engage the drive member and, in operation of the actuator, are driven by the drive member.

The actuator may comprise a worm of a worm transmission. Both the spindle transmission and the second spindle transmission may be coupled to the worm. The actuator may include a first worm transmission stage having a first worm meshing with a first worm gear, and a second worm rotationally fixed to the first worm gear. The second worm may mesh with a second worm gear which is coupled to the spindle transmission and with another second worm gear which is coupled to the second spindle transmission.

The headrest system may comprise at least one actuation member which is articulated along a pivot axis. The pivot axis may extend perpendicular to a longitudinal axis of the spindle. The pivot axis may extend parallel to the longitudinal member.

The headrest system may comprise a first actuation member coupled to a first coupling portion of the spindle transmission. The headrest system may comprise a second actuation member coupled to a second coupling portion of the second spindle transmission. The actuator may be configured such that a first displacement of the first coupling portion caused by the spindle transmission and a second displacement of the second coupling portion caused by the second spindle transmission have equal magnitudes and opposite directions. Thereby, a robust adjustment can be attained which mitigates the risk of an actuation member becoming seized.

The first actuation member may include at least one lever which is pivotably mounted. The second actuation member may include at least one lever which is pivotably mounted. The first actuation member may include at least two levers which form a first knee joint. The second actuation member may include at least two levers which form a second knee joint.

The spindle may be mounted so as to rotate upon actuation of the power drive. If the second spindle transmission has a second spindle, the second spindle may also be mounted so as to rotate upon actuation of the power drive. The spindle nut and the second spindle nut may be mounted such that they cannot rotate about the longitudinal axis of the spindle.

The spindle nut and the second spindle nut may be mounted so as to rotate upon actuation of the power drive. The spindle and a second spindle of the second spindle transmission may be mounted such that they cannot rotate about their longitudinal axes.

The actuator may comprise a second spindle. The second spindle nut may be engaged with the second spindle. The second spindle may be parallel to the spindle. The second spindle may be offset relative to the spindle in a direction parallel to the longitudinal member of the bracket.

An external thread of the spindle and a second external thread of the second spindle may have equal pitch and equal helicity. Thereby, the number of different components which needs to be used may be reduced.

The spindle nut may be engaged with a first portion of the spindle which has a first external thread having a first helicity, and the second spindle nut may be engaged with a second portion of the spindle which has a second external thread having a second helicity opposite to the first helicity. The spindle may be mounted so as to be rotatable. The spindle nut and the second spindle nut may have inner threads with opposite helicity. With such a configuration, it is sufficient to provide one spindle. The first external thread and the second external thread may have equal pitch.

The power drive may comprise a motor, in particular an electric motor. The actuator may have a two-stage worm transmission which is coupled between the motor and the spindle transmission. A worm of a first worm transmission of the two-stage worm transmission may be coupled to an output shaft of the motor in a torque-prove manner. A worm gear of a second worm transmission of the two-stage worm transmission may be coupled to the spindle or the spindle nut in a torque-prove manner.

The spindle and, if present, the second spindle may be flexible. The spindle and, if present, the second spindle may be configured such that, when a force of about 250 N is exerted onto the headrest, the spindle is still elastically deformed. Thereby, the danger of breakage may be reduced. The spindle and, if present, the second spindle may be a flexible shaft or flex-shaft which is provided with an external thread. The flexible shaft may have a metal core comprising one metal wire or a plurality of metal wires. The flexible shaft may have an external thread. The flexible shaft may have a metal wire helix on its outer surface for forming the external thread.

The spindle may have a helical external thread and the spindle nut may have a helical internal thread which engages the helical external thread of the spindle.

The headrest system may be configured such that the bracket acts as a guide bracket and the headrest is displaceable along the guide bracket. The headrest system may include a height adjustment spindle for displacing the headrest in a height direction, i.e. along the longitudinal member of the bracket. The height adjustment spindle may be transverse to the spindle which is used for displacing at least a portion of the headrest in the displacement direction transverse to the longitudinal member of the bracket.

The bracket may comprise a pair of rods, which act as longitudinal member, and a cross member extending between the pair of rods. The actuator may be configured to displace at least a portion of the headrest in a direction transverse to a longitudinal axis of the rods. The power drive may be attached to the cross member. The power drive may be received in a recess of the cross member. Thereby, robust mounting in the compact space within the headrest may be attained.

According to another embodiment, a seat is provided which comprises a backrest and a headrest system according to an aspect or embodiment. The bracket of the headrest system may be attached to the backrest.

The seat may be a vehicle seat. The seat may be an automotive vehicle seat. The seat may be a car seat.

A method of adjusting a headrest according to an embodiment uses a power drive. The method comprises activating the power drive arranged in a cavity defined within an outer shell of the headrest to drive a spindle transmission, the spindle transmission comprising a spindle and a spindle nut engaged with the spindle. The spindle transmission displaces at least a portion of the headrest relative to the bracket in a displacement direction which is arranged at an angle relative to a longitudinal member of the bracket.

The method may be performed using the headrest system of any one aspect or embodiment.

Further features of the method and effects respectively attained thereby correspond to features of the headrest system according to embodiments.

According to another embodiment, there is provided an actuator. The actuator comprises an electric motor, a speed reduction mechanism, a spindle transmission and a second spindle transmission, the spindle transmission comprising a spindle and a spindle nut and the second spindle transmission comprising a second spindle nut. The speed reduction mechanism is coupled between the electric motor and the spindle transmission, such that a drive member of the speed reduction mechanism drives the spindle transmission. The speed reduction mechanism is coupled between the electric motor and the second spindle transmission, such that the drive member of the speed reduction mechanism drives the second spindle transmission.

In the actuator, the second spindle transmission may comprise a second spindle. The drive member may be configured to rotationally drive both the spindle and the second spindle. The drive member may be configured to rotationally drive both the spindle nut and the second spindle nut. The drive member may be a worm of a two-stage worm transmission.

The actuator may be dimensioned for mounting within a headrest.

The actuator may comprise a first actuation member coupled to a first coupling portion of the spindle transmission. The headrest system may comprise a second actuation member coupled to a second coupling portion of the second spindle transmission. The actuator may be configured such that a first displacement of the first coupling portion caused by the spindle transmission and a second displacement of the second coupling portion caused by the second spindle transmission have equal magnitudes and opposite directions. Thereby, a robust adjustment can be attained.

The devices and methods according to various embodiments may be utilized for adjusting a headrest. The devices and methods according to the various embodiments may be used for adjusting a headrest of a vehicle seat, in particular of an automotive vehicle seat.

BRIEF DESCRIPTION OF THE SEVERAL VIEWS OF THE DRAWINGS

Additional features and advantages of the invention will become more readily appreciated from the following detailed description of preferred or advantageous embodiments with reference to the accompanying drawings.

DESCRIPTION OF EMBODIMENTS

Figure 1:
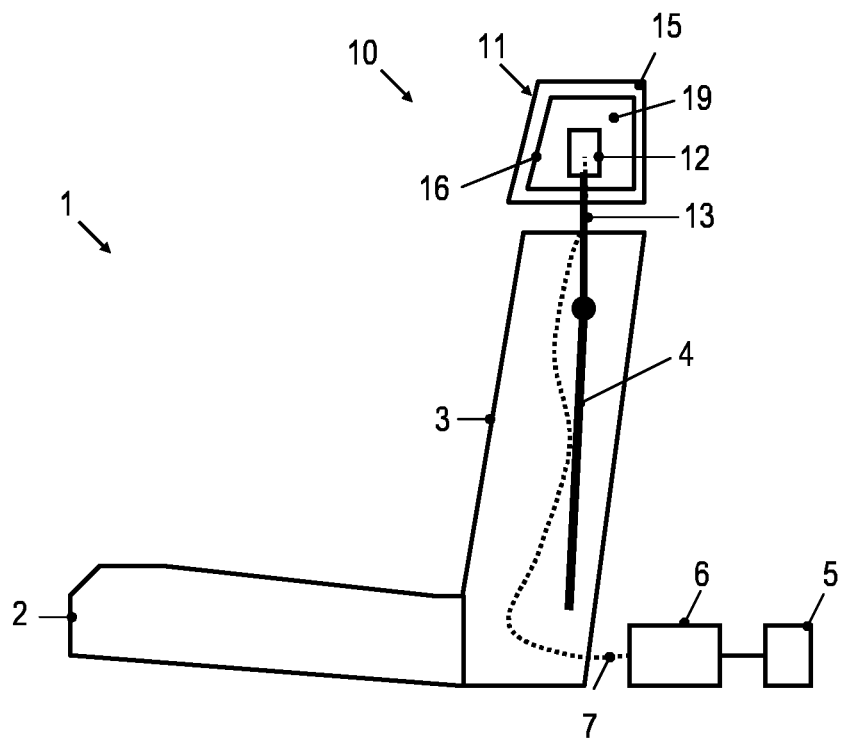
FIG. 1 is a schematic view of a seat according to an embodiment.

Exemplary embodiments of the invention will now be described with reference to the drawings. While some embodiments will be described in the context of specific fields of application, such as in the context of automotive vehicle seating, the embodiments are not limited to this field of application. The features of the various embodiments may be combined with each other unless specifically noted otherwise. In the drawings, like reference numerals refer to like elements.

FIG. 1 is a schematic view of a seat 1 according to an embodiment. The seat 1 may be configured as a vehicle seat. The seat 1 may be configured as an automotive vehicle seat. The seat 1 may be configured as a car seat.

The seat 1 generally comprises a seat member 2, a backrest 3 and a headrest system 10. The headrest system 10 may be mounted to the backrest 3. The headrest system 10 may include a bracket having a longitudinal member 13, e.g. rods which have lower ends mounted to the backrest 3. The lower ends of the rods of the bracket may be attached to a frame 4 of the backrest 3.

The headrest system 10 includes a headrest 11 formed so as to support an occupant's head. The headrest 11 has an internal cavity 19. Adjustment of the headrest 11 is performed using an actuator 12. The actuator 12 is arranged in the cavity 19 which is formed in an interior of the headrest 11. The actuator 12 is integrated into the headrest 11. When the actuator 12 is actuated, e.g. by supplying electrical power thereto, the actuator 12 displaces at least a portion of the headrest 11 relative to the longitudinal member 13 of the bracket. The longitudinal member 13 of the bracket may remain stationary relative to the frame 4 of the backrest 3. The longitudinal member 13 of the bracket may be arranged such that it is not displaced relative to the frame 4 of the backrest 3 when the actuator 12 is activated. The actuator 12 is configured to displace at least a portion of the headrest in a displacement direction which is transverse to the longitudinal member 13 of the bracket. The actuator 12 may be configured to displace at least a portion of the headrest in a displacement direction which is perpendicular to the longitudinal member 13 of the bracket. The actuator 12 may be configured to displace at least a portion of the headrest in a displacement direction which extends in a horizontal plane. The actuator 12 may be configured to displace at least a portion of the headrest in a forward-rearward direction, relative to a seat occupant. Such an adjustment will be referred to as x-adjustment or adjustment in the x-direction (with the z-direction being the vertical direction). In some implementations, the front surface of the cover 15 may be displaced in the x-direction without altering its shape. In other implementations, lateral portions of the front surface of the cover 15 may be displaced in the x-direction to thereby alter a curvature or other geometrical features of the front surface of the cover 15.

The headrest 11 may have any configuration which provides an internal cavity within the headrest 11, so that the headrest 11 can house the actuator 12. For illustration, the headrest 11 may include a headrest cover 16. The headrest cover 16 may be formed from plastic. A fabric cover 15 may be provided around the headrest cover 16. The fabric cover 15 may include a padding material for increased comfort. The headrest cover 16 may be configured so as to define the external shape of the headrest 11 and to provide structural rigidity to the headrest 11. The headrest cover 16 may be configured such that it defines the internal cavity 19 in which the actuator 12 is housed.

A controller 6 may control operation of the actuator 12. The controller 6 may be coupled to the actuator through an electrical connection 7. The controller 6 may control the voltage applied at the electrical connection 7 to thereby control activation of the actuator 12. The electrical connection 7 may pass through an internal cavity in rods 13 of the bracket which mount the headrest system 10 to the backrest 3. The control may be performed in different ways. A user interface 5 may be provided which is coupled to the controller 6, so as to allow a user to effect an adjustment of the headrest 11 under the control of a user action. Alternatively or additionally, the controller 6 may automatically control the actuator 12 when a certain driver is recognized, to thereby set the headrest 11 to a configuration (x-position or shape of front surface of the headrest) which is suitable for the respective driver. An identification of a suitable headrest configuration may be automatically performed based on an identifier stored in a vehicle authorization element (vehicle key or corresponding key-like element) and a look-up table which stores heights for the headrest 11 for various identifiers. The controller 6 may automatically set the configuration of the headrest 11 by activating the actuator 12, when required, when the identifier is read from the vehicle authorization element. The controller 6 may include a memory which stores a present position of the actuator 12 of the headrest 11. Alternatively or additionally, the controller 6 may automatically control the actuator 12 in response to a critical event, such as a collision.

With reference to FIG. 2 to FIG. 25, configurations of headrest systems according to embodiments will be described in detail. The headrest systems may be used as headrest system 10 in the seat 1 of an embodiment.

Generally, the actuator of the headrest system includes a spindle transmission and a power drive which drives the spindle transmission. The spindle transmission includes a spindle and a spindle nut threadingly engaged therewith. The spindle and spindle nut may have a longitudinal axis. One of the spindle and the spindle nut may be mounted such that it is rotatable about its longitudinal axis. The other one of the spindle and the spindle nut may be mounted such that it is not rotatable about its longitudinal axis. The actuator includes a power drive which rotationally drives the one of the spindle and the spindle nut which is rotatable about its longitudinal axis. The actuator may include a second spindle transmission which has a second spindle nut. The actuator may be mounted on the bracket, on a part of the headrest 11, in particular on a rigid cover of the headrest 11, or on another component. The spindle may be arranged such that it extends transverse to the longitudinal member 13 of the bracket. The spindle may be arranged such that, when the headrest 11 is mounted to the seat, the spindle extends in a horizontal direction. The second spindle transmission may comprise a second spindle which extends parallel to the spindle.

The actuator may comprise a motor and a mechanism for speed reduction. The speed reduction mechanism may include at least one worm transmission which is coupled between an output shaft of the motor and the one of the spindle and the spindle nut which is rotatable about its longitudinal axis. The speed reduction mechanism may include a two-stage worm transmission having a first worm transmission and a second worm transmission coupled between an output shaft of the motor and the one of the spindle and the spindle nut which is rotatable about its longitudinal axis. Such configurations allow the forces required for headrest system adjustment, which may be up to 200 N, to be attained with a compact actuator. Such an actuator may be dimensioned such that it can be mounted in the cavity in the interior of the headrest.

Figure 2:
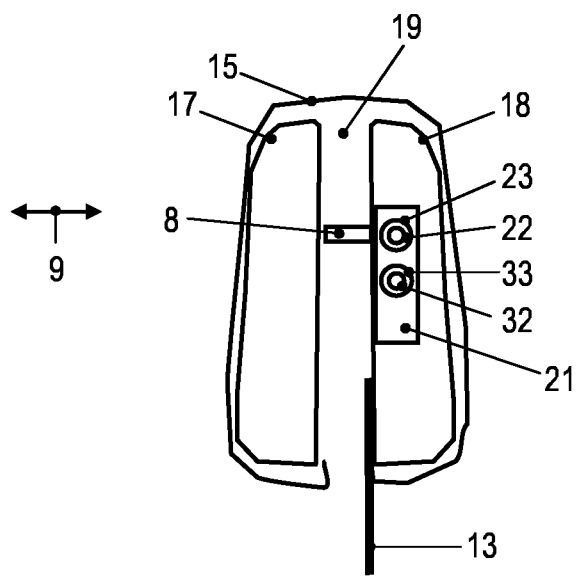
FIG. 2 is a schematic cross-sectional view of a headrest system according to an embodiment.

FIG. 2 is a schematic cross-sectional view of a headrest system of an embodiment. The cross-section represents a plane perpendicular to a longitudinal axis of a spindle 22 of the spindle transmission and a longitudinal axis of a second spindle 32 of a second spindle transmission. The actuator generally includes a power drive 21 and a spindle transmission. The spindle transmission includes the spindle 22 and a spindle nut 23 through which the spindle 22 extends. The spindle nut 23 may have an internal helical thread. The spindle 22 may have a mating external helical thread. The external thread of the spindle 22 and the internal thread of the spindle nut 23 are threadingly engaged. The actuator may include a second spindle transmission which includes a second spindle nut 33. The second spindle nut 33 may be threaded onto the spindle 22 or onto a separate second spindle 32.

The headrest system may be configured such that the actuator with the power drive 21, the spindle 22, the spindle nut 23, the second spindle nut 33 and, if present, the second spindle 32 remains positioned in the cavity 19 of the headrest for any position which the headrest and its components can have relative to the bracket.

When the headrest includes a headrest cover which defines the outer shape of the headrest, the headrest cover may be formed of a plurality of shells. Each one of the shells may be formed from plastic. The shells may be attached to each other. For illustration, the headrest cover may include a first half shell 17 and a second half shell 18 which, in combination, form the headrest cover of the headrest. A cushioning material and/or fabric cover 15 may be provided to surround the headrest cover formed by the first and second half shells 17, 18. Upon assembly of the headrest system, the actuator may be mounted to one of the half shells 17, 18. The other one of the half shells may subsequently be attached thereto. Thereby, the actuator is housed in the cavity in the interior of the headrest. The headrest cover includes recesses through which rods of the guide bracket 13 extend.

Using the actuator, at least a component of the headrest 11 may be displaced along a direction 9 which may be the forward-rearward direction, for example. The component of the headrest 11 may be displaced relative to the longitudinal members 13 of the bracket which, in the installed state, attach the headrest system to the backrest.

At least one pivotable lever 8 may be integrated into the headrest 11. The pivotable lever 8 may be pivotable about an axis which is transverse to a longitudinal axis of the spindle 22 and, if present, the second spindle 32. The pivotable lever 8 may have a pivot axis which extends parallel to the longitudinal member 13. At least two pivotable levers may be provided to convert a linear movement generated by the spindle transmission(s) to a displacement in the x-direction. A first lever may be coupled to a first coupling portion of the spindle transmission. A second lever may be coupled to a second coupling portion of the second spindle transmission. The actuator may be configured to displace the first coupling portion and the second coupling portion by equal distances, but in opposite directions. The first and second coupling portions may be formed on the spindle 22 and the second spindle 32 when the spindle 22 and the second spindle 32 are mounted to be displaceable in a translatory fashion. The first and second coupling portions may be formed on the spindle nut 23 and the second spindle nut 33 when the spindle nut 23 and the second spindle nut 33 are mounted to be displaceable in a translatory fashion.

With reference to FIG. 3 to FIG. 25, the configurations of actuators of headrest system according to embodiments will be explained in more detail. Features which correspond, in terms of configuration or function, to features explained with reference to FIG. 1 or FIG. 2 are designated with the same reference numerals.

Figure 3:
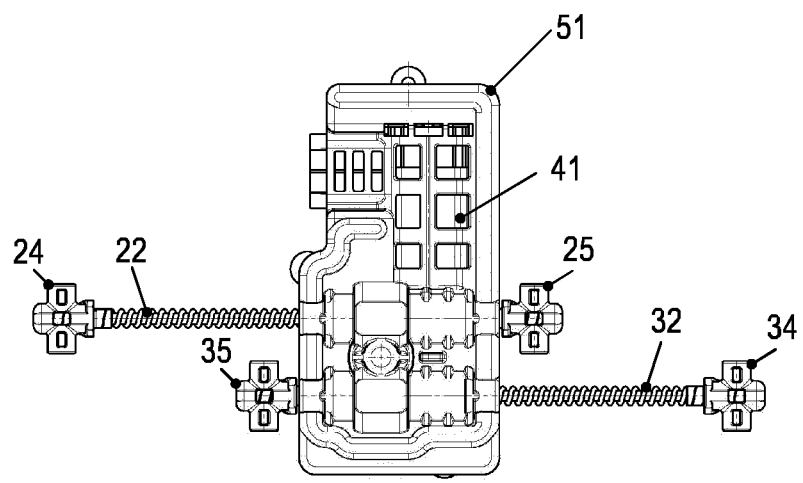
FIG. 3 is a plan view of an actuator of a headrest system according to an embodiment.
Figure 4:
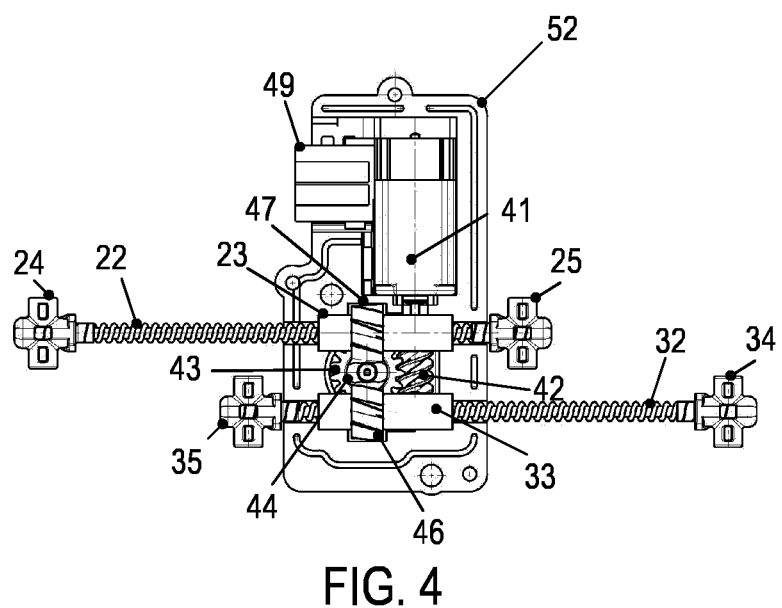
FIG. 4 is a plan view of the actuator of FIG. 3 with a housing shell removed.
Figure 5:
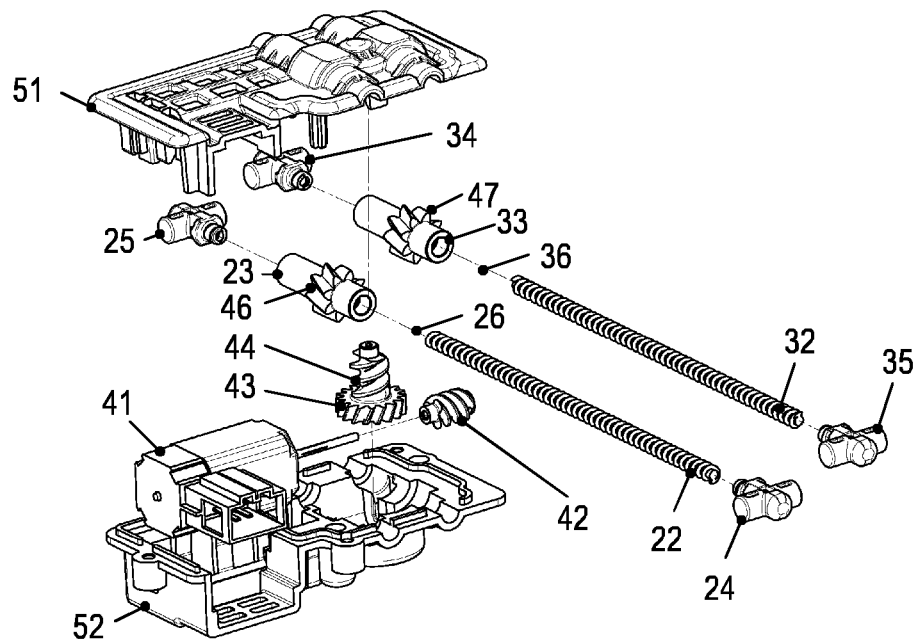
FIG. 5 is a perspective exploded view of the actuator of FIG. 3.

FIG. 3 to FIG. 5 show an actuator for a headrest system of an embodiment, with FIG. 3 showing a plan view, FIG. 4 showing a partially broken-away plan view with a housing shell removed, and FIG. 5 showing an exploded perspective view.

The actuator includes a power drive 41 which may be mounted in a housing having a first housing shell 51 and a second housing shell 52. A connector 49 may be attached to the power drive 41 to supply power and/or control signals thereto. The connector 49 may be exchangeable for interoperability with different power supply and/or control systems.

The actuator includes a spindle transmission which comprises a spindle 22 and a spindle nut 23. An external thread of the spindle 22 and an internal thread of the spindle nut 23 are engaged with each other. The actuator includes a second spindle transmission which comprises a second spindle 32 and a second spindle nut 33. An external thread of the second spindle 32 and an internal thread of the second spindle nut 33 are engaged with each other. The actuator is configured such that the spindle nut 23 and the second spindle nut 33 are rotatably mounted. The housing shells 51, 52 may define recesses which allow the spindle nut 23 and the second spindle nut 33 to rotate, while preventing axial movement of the spindle nut 23 and the second spindle nut 33. The spindle 22 and the second spindle 32 are mounted such that they cannot rotate about their longitudinal axes, but can move through the associated spindle nut when the associated spindle nut rotates. To prevent rotation of the spindle 22 and the second spindle 32, end portions 24, 25, 34, 35 provided at ends of the spindle 22 and the second spindle 32 may be engaged with other components of the headrest system. The end portions 24, 25, 34, 35 may be overmolded onto the respective spindle and may also serve as end stops for the movement of the spindle 22 and the second spindle 32. An end portion 24 at an end of the spindle 22 may serve as first coupling portion for coupling with a first lever. The end portion 24 may have projections which abut on the first lever. The end portion 34 at an end of the second spindle 32 may serve as second coupling portion for coupling with a second lever. The end portion 34 may have projections which abut on the second lever. The projections may extend perpendicular to a longitudinal axis 26 of the spindle 22 and a longitudinal axis 36 of the second spindle 32.

The power drive of the actuator includes a speed reduction mechanism. The speed reduction mechanism may include a two-stage worm transmission which has a first worm transmission and a second worm transmission. A worm 42 of a first worm transmission is coupled to the output shaft of the motor 41 in a rotationally fixed manner. I.e., the worm 42 rotates jointly with the output shaft of the motor 41. In an embodiment, the worm 42 may be integrally formed onto the output shaft of the motor 41. A worm gear 43 of the first worm transmission meshes with the worm 42.

A second worm 44 of a second worm transmission is coupled to the worm gear 43 of the first worm transmission in a rotationally fixed manner. I.e., the second worm 44 rotates jointly with the worm gear 43 of the first worm transmission. In an embodiment, the second worm 44 and the worm gear 43 of the first worm transmission may be formed on a common shaft. Both a second worm gear 46 associated with the spindle transmission and a second worm gear 47 associated with the second spindle transmission meshes with the second worm 44. It will be appreciated that the worm 42 and worm gear 43 of the first worm transmission provide a rotation speed reduction, and that the second worm 44 and the second worm gear 46, 47 provide a further rotation speed reduction.

The second worm gear 46 is coupled to the spindle nut 23 in a rotationally fixed manner. In an embodiment, the second worm gear 46 may be formed onto an outer surface of the spindle nut 23. The second worm gear 47 is coupled to the second spindle nut 33. In an embodiment, the second worm gear 47 may be formed onto an outer surface of the second spindle nut 33. A rotary movement of the output shaft of the motor 41 causes the spindle nut 23 and the second spindle nut 33 to rotate at a reduced speed compared to the rotation speed of the output shaft of the motor 41, the speed reduction being effected by the two-stage worm transmission. Torque is increased accordingly.

The spindle nut 23 has an internal thread engaging an outer thread of the spindle 22. The internal thread of the spindle nut 23 and the outer thread of the spindle 22 extend about the longitudinal axis 26 and through the spindle nut 23. Rotation of the spindle nut 23 effects a translational displacement of the spindle 22 along the longitudinal axis 26. The second spindle nut 33 has an internal thread engaging an outer thread of the second spindle 32. Rotation of the second spindle nut 33 effects a translational displacement of the second spindle 32 along the longitudinal axis 36, in a direction opposite to that of the spindle 22. The spindle 22 and the second spindle 32 may have threads with equal pitch and, optionally, equal helicity. The spindle 22 and second spindle 32 are then displaced by equal amounts, but in opposite directions. The spindle nut 23 and second spindle nut 33 act as bushings through which the associated spindle 22 or second spindle 32 moves. The resultant movement of the first coupling portion 24 and the second coupling portion 34 may be converted to a displacement of at least a portion of the headrest in the x-direction or the x-y-direction, as will be explained in more detail with reference to FIG. 12 to FIG. 25.

The motor 41, the worm 42, the worm gear 43, the second worm 44, the second worm gears 46, 47, the spindle nut 23 and the second spindle nut 33 are supported in the housing having housing shells 51 and 52. The housing shells 51 and 52 define recesses in which the worm 42, the worm gear 43, the second worm 44, the second worm gears 46, 47, the spindle nut 23 and the second spindle nut 33 may be received so as to be rotatable. The housing shells 51, 52 may be attached to one another. The housing may have attachment features for attachment to the headrest bracket, to a half shell of the headrest, or to another rigid member of the headrest system.

The housing shells 51, 52 of the housing of the power drive may be attached to each other by a welded seam. The housing shells 51, 52 may be attached to each other by a welded seam formed by laser welding. The housing shells 51, 52 may be attached to each other by a welded seam formed by ultrasonic welding. Accordingly, a method of manufacturing the actuator 12 may comprise attaching the housing shells 51, 52 to each other by laser welding or by ultrasonic welding.

Figure 6:
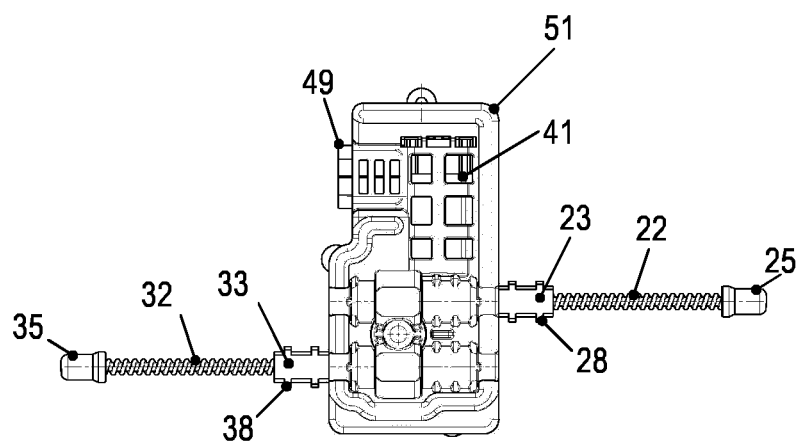
FIG. 6 is a plan view of an actuator of a headrest system according to an embodiment.
Figure 7:
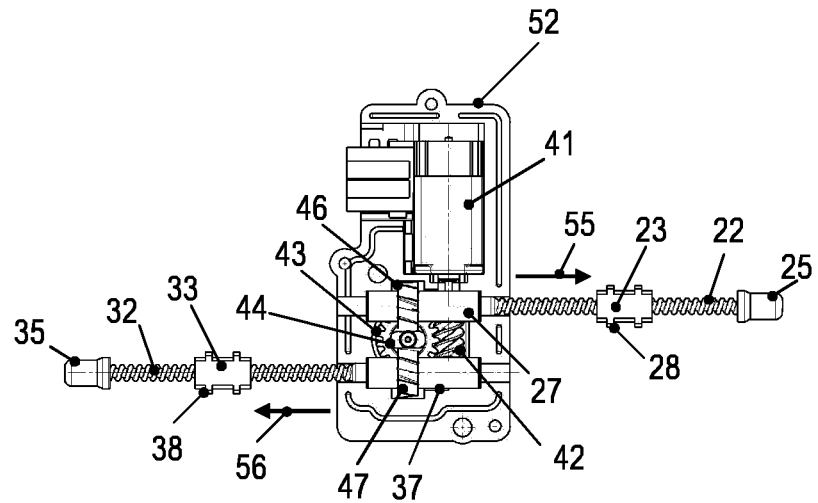
FIG. 7 is a plan view of the actuator of FIG. 6 with a housing shell removed.
Figure 8:
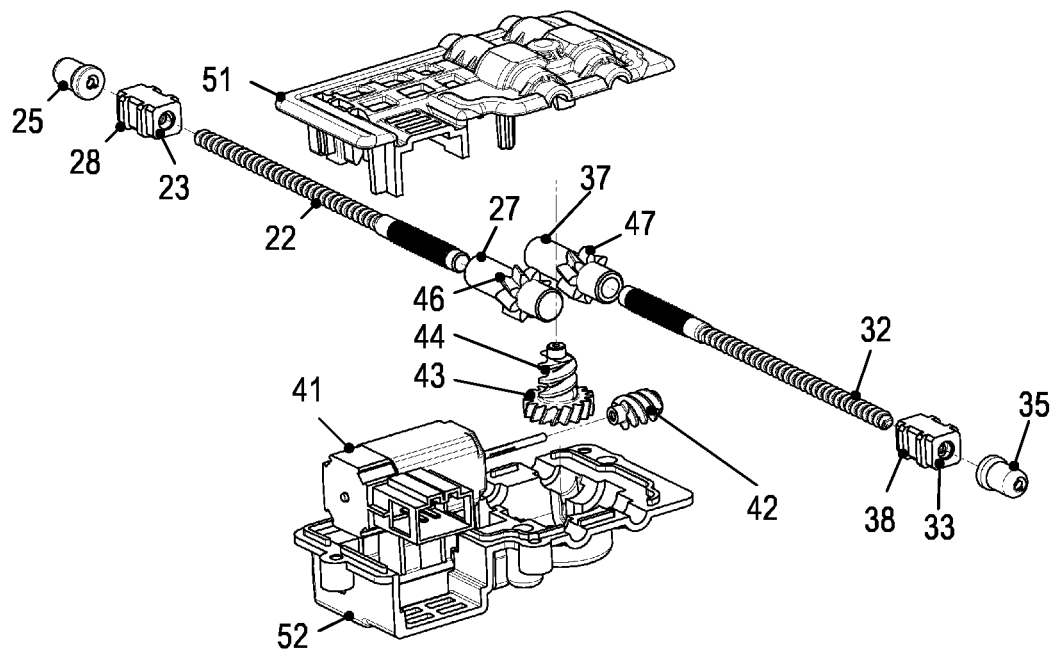
FIG. 8 is a perspective exploded view of the actuator of FIG. 6.

FIG. 6 to FIG. 8 show an actuator for a headrest system of an embodiment, with FIG. 6 showing a plan view, FIG. 7 showing a partially broken-away plan view with a housing shell removed, and FIG. 8 showing an exploded perspective view.

Generally, the actuator of FIG. 6 to FIG. 8 is configured such that it includes a spindle transmission with a spindle 22 and a second spindle transmission with a separate second spindle 32. The spindle 22 and the second spindle 32 are mounted so as to be rotatable relative to the housing shells 51, 52. The spindle 22 and the second spindle 32 are mounted such that they are secured against displacement along their longitudinal axes. The spindle 22 and the second spindle 32 may extend parallel to each other and may be offset from each other in a direction perpendicular to the longitudinal axes of the spindle 22 and the second spindle 32. The spindle 22 and the second spindle 32 may be mounted such that, when the actuator is installed, the spindle 22 and the second spindle 32 extend in a horizontal direction.

The spindle transmission includes a spindle nut 23. An inner thread of the spindle nut 23 is engaged with an outer thread of the spindle 22. A first coupling portion 28 for coupling with an actuation member may be formed at the outer surface of the spindle nut 23. The spindle nut 23 is mounted such that it is displaceable along the longitudinal axis of the spindle 22, but that it is secured against rotation about the longitudinal axis. The spindle nut 23 may be secured against rotation by the actuation member to which it is coupled, e.g. by a lever, and/or by a dedicated guide. The second spindle transmission includes a second spindle nut 33. An inner thread of the second spindle nut 33 is engaged with an outer thread of the second spindle 32. A second coupling portion 38 for coupling with an actuation member may be formed at the outer surface of the second spindle nut 33. The second spindle nut 33 is mounted such that it is displaceable along the longitudinal axis of the second spindle 32, but that it is secured against rotation about the longitudinal axis. The second spindle nut 33 may be secured against rotation by the actuation member to which it is coupled, e.g. by a lever, and/or by a dedicated guide.

A power drive causes the spindle 22 and the second spindle 32 to rotate. The spindle 22 and the second spindle 32 may have external threads with the same helicity. I.e., both external threads may be left-handed or both external threads may be right-handed. A bushing 27 may be attached to the spindle 22 in a rotationally fixed manner, such that rotation of the bushing 27 forces the spindle 22 to rotate jointly with the bushing 27. The bushing 27 may be molded onto the spindle 22. A second bushing 37 may be attached to the second spindle 32 in a rotationally fixed manner, such that rotation of the second bushing 37 forces the second spindle 32 to rotate jointly with the second bushing 37. The second bushing 37 may be molded onto the second spindle 32.

A second worm wheel 46 may be connected to the bushing 27 in a rotationally fixed manner. The second worm wheel 46 may be integrally formed on an outer surface of the bushing 27. The second worm wheel 46 may mesh with a worm 44 of a speed reduction mechanism of the power drive. A second worm wheel 47 may be connected to the second bushing 37 in a rotationally fixed manner. The second worm wheel 47 may be integrally formed on an outer surface of the second bushing 37. The second worm wheel 47 may mesh with the worm 44 of the speed reduction mechanism of the power drive. The speed reduction mechanism may be a two-stage worm transmission, which includes a first worm 42 coupled to an output shaft of a motor 41, a first worm wheel 43 meshing with the first worm 42, and the second worm 44 which is connected to the first worm wheel 43 in a rotationally fixed manner, as explained with reference to the actuator of FIG. 3 to FIG. 5. The second worm wheel 46 of the bushing 27 and the second worm wheel 47 of the second bushing 37 may have identical configurations, in particular equal numbers of teeth and equal diameters.

In operation, when the motor 41 is actuated, the power drive causes the spindle 22 and the second spindle 32 to rotate. The spindle 22 and the second spindle 32 are secured against displacement along their longitudinal axes by the housing shells 51, 52. With the spindle 22 and the second spindle 32 being both coupled to the same second worm 44, the spindle 22 and the second spindle 32 are rotated by the same angles and with the same rotation speeds. The spindle nut 23 and the second spindle nut 33 are secured against rotation about the longitudinal axes of the associated spindle.

Rotation of the spindle 22 causes the spindle nut 23 to be displaced along the spindle 22. Rotation of the second spindle 32 causes the second spindle nut 33 to be displaced along the second spindle 32. A first displacement 55 of the spindle nut 23 and a second displacement 56 of the second spindle nut 33 have equal magnitudes, but opposite directions. The spindle nut 23 and the second spindle nut 33 are displaced symmetrically relative to a center point. The resultant movement of the first coupling portion 28 and the second coupling portion 38 is converted to a displacement of at least a portion of the headrest in the x-direction or the x-y-direction, as will be explained in more detail with reference to FIG. 12 to FIG. 25. End stops 25, 35 may be provided to limit movement of the spindle nut 23 and the second spindle nut 33.

Other features and modifications of the actuator of FIG. 6 to FIG. 8 correspond to the features explained for the actuator of FIG. 3 to FIG. 5.

Figure 9:
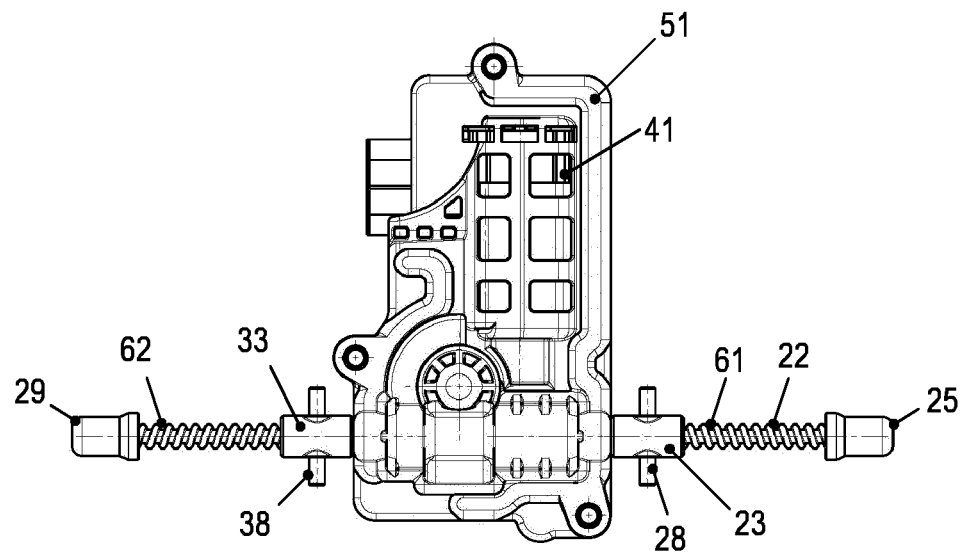
FIG. 9 is a plan view of an actuator of a headrest system according to an embodiment.
Figure 10:
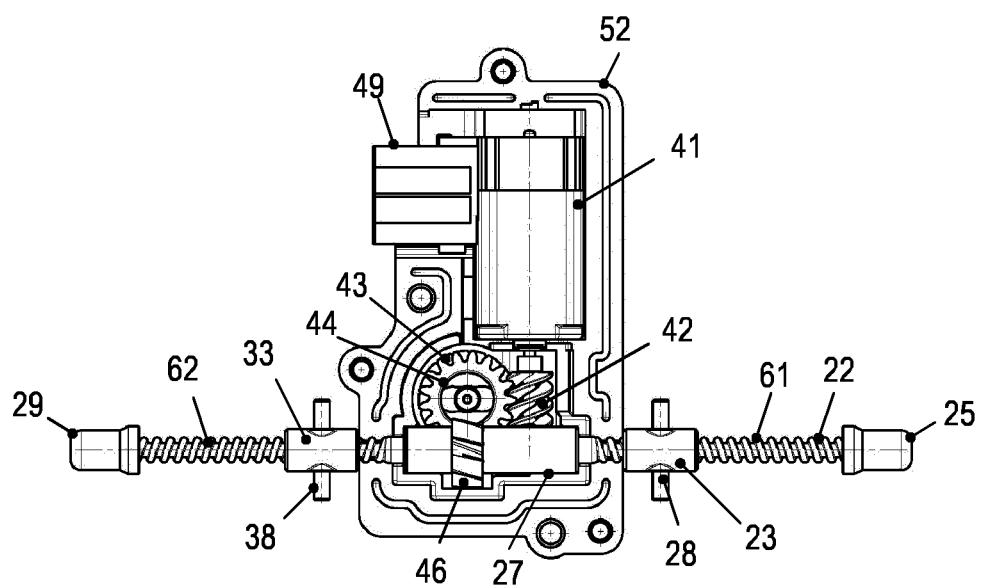
FIG. 10 is a plan view of the actuator of FIG. 9 with a housing shell removed.
Figure 11:
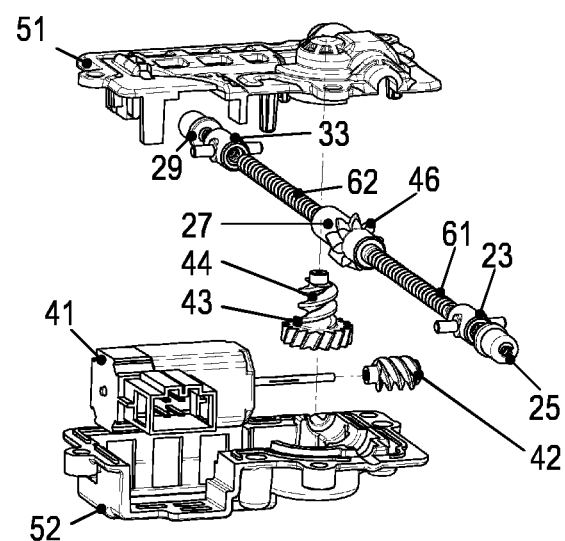
FIG. 11 is a perspective exploded view of the actuator of FIG. 9.

FIG. 9 to FIG. 11 show an actuator for a headrest system of an embodiment, with FIG. 9 showing a plan view, FIG. 10 showing a partially broken-away plan view with a housing shell removed, and FIG. 11 showing an exploded perspective view.

Generally, the actuator of FIG. 9 to FIG. 11 is configured such that it uses a spindle 22 which is rotated by the power drive. A spindle nut 23 and a second spindle nut 33 are secured against rotation about the longitudinal axis of the spindle 22 and which are displaced along the longitudinal axis of the spindle 22 in a translatory fashion. Both the spindle nut 23 and the second spindle nut 33 are engaged with the same spindle 22.

The spindle 22 may have a first external thread 61 formed on one portion of the spindle 22. The spindle 22 may have a second external thread 62 formed on another portion of the spindle 22. The first external thread 61 may extend on one side from the housing shells 51, 52, and the second external thread 62 may extend on the opposite side from the housing shells 51, 52. The first external thread 61 may have a first helicity and the second external thread 62 may have a second helicity opposite to that of the first external thread. The first external thread 61 may be right-handed and the second external thread 62 may be left-handed, or vice versa. Accordingly, an inner thread of the spindle nut 23 and an inner thread of the second spindle nut 33 may have opposite helicities, with the helicity of the inner thread of the spindle nut 23 matching the helicity of the first external thread 61 and the helicity of the inner thread of the second spindle nut 33 matching the helicity of the second external thread 62. A pitch of the first external thread 61 may be equal to a pitch of the second external thread 62.

While only a single spindle 22 is used, the spindle 22 in combination with the spindle nut 23 forms a spindle transmission, and the spindle 22 in combination with the second spindle nut 33 may define a second spindle transmission. In operation, the spindle nut 23 and the second spindle nut 33 are displaced in opposite directions when the power drive rotates the spindle 22.

The spindle 22 is mounted so as to be rotatable relative to the housing shells 51, 52. The spindle 22 is mounted such that it is secured against displacement along its longitudinal axis. The spindle 22 may be mounted such that, when the actuator is installed, the spindle 22 extends in a horizontal direction. A first coupling portion 28 for coupling with an actuation member may be formed at an outer surface of the spindle nut 23. The spindle nut 23 is mounted such that it is displaceable along the longitudinal axis of the spindle 22, but that it is secured against rotation about the longitudinal axis. The spindle nut 23 may be secured against rotation by the actuation member to which it is coupled, e.g. by a lever, and/or by a dedicated guide that may be formed on the headrest. A second coupling portion 38 for coupling with an actuation member may be formed on the outer surface of the second spindle nut 33. The second spindle nut 33 is mounted such that it is displaceable along the longitudinal axis of the second spindle 32, but that it is secured against rotation about the longitudinal axis. The second spindle nut 33 may be secured against rotation by the actuation member to which it is coupled, e.g. by a lever, and/or by a dedicated guide that may be formed on the headrest.

A power drive causes the spindle 22 to rotate. A bushing 27 may be attached to the spindle 22 in a rotationally fixed manner, such that rotation of the bushing 27 forces the spindle 22 to rotate jointly with the bushing 27. The bushing 27 may be molded onto the spindle 22. A second worm wheel 46 may be connected to the bushing 27 in a rotationally fixed manner. The second worm wheel 46 may be integrally formed on an outer surface of the bushing 27. The second worm wheel 46 may mesh with a worm 44 of a speed reduction mechanism of the power drive. The speed reduction mechanism may be configured and may operate as described with reference to FIG. 3 to FIG. 8.

In operation, when the motor 41 is actuated, the power drive causes the spindle 22 to rotate. The spindle nut 23 and the second spindle nut 33 are secured against rotation about the longitudinal axes of the associated spindle. Rotation of the spindle 22 causes the spindle nut 23 to be displaced along the spindle 22. Rotation of the second spindle 32 causes the second spindle nut 33 to be displaced along the spindle 22. A first displacement of the spindle nut 23 and a second displacement of the second spindle nut 33 have equal magnitudes, but opposite directions. The spindle nut 23 and the second spindle nut 33 are displaced symmetrically relative to a center point. The resultant movement of the first coupling portion 28 and the second coupling portion 38 is converted to a displacement of at least a portion of the headrest in the x-direction or the x-y-direction, as will be explained in more detail with reference to FIG. 12 to FIG. 25. End stops 25, 29 may be provided to limit movement of the spindle nut 23 and the second spindle nut 33.

Other features and modifications of the actuator of FIG. 9 to FIG. 11 correspond to the features explained for the actuator of FIG. 3 to FIG. 8.

The actuators of FIG. 3 to FIG. 11 generate a symmetrical movement of two spindles or two spindle nuts in a horizontal direction. The speed reduction mechanism provides sufficient torque increase to use the actuator for headrest adjustment. The translatory movement of the two spindles or two spindle nuts is used to adjust at least a portion of the headrest relative to the bracket which mounts the headrest to the seat. At least a portion of the backrest is adjusted in a direction which is arranged at an angle relative to the longitudinal member 13 of the bracket, i.e. which is not parallel to the longitudinal member 13 of the bracket. The portion of the backrest or the backrest as a whole may be displaced in the x-direction (forward-rearward direction) or may be displaced along a two-dimensional path in the x-y-direction (i.e., forward-rearward and lateral directions), using the actuator of any one of FIG. 3 to FIG. 11. Any suitable linkage mechanism may be used to convert the translatory movement of the spindles or spindle nuts into a displacement of a component of the headrest in the x-direction or in the x-y-direction. In particular, at least one pivotable lever may be used. The pivotable lever may have a pivot axis which extends perpendicular to the longitudinal axis of the spindle.

Exemplary implementations of such linkage mechanisms will be explained in more detail with reference to FIG. 12 to FIG. 25. In each one of the various implementations, any one of the actuators explained with reference to FIG. 3 to FIG. 11 may be used.

Figure 12:
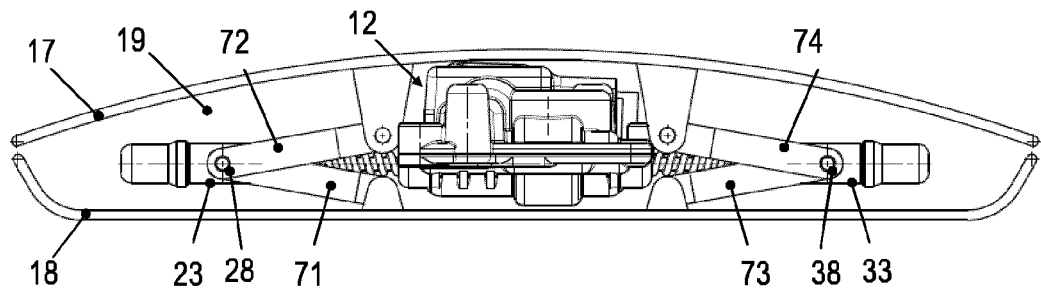
FIG. 12 to FIG. 14 are partially broken-away top views of a headrest system according to an embodiment for illustrating operation of an actuator.
Figure 13:
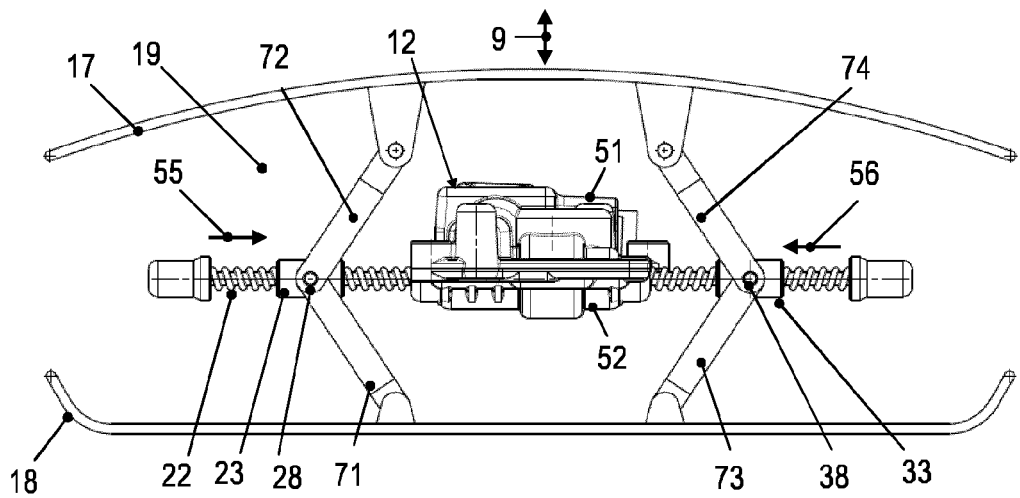
Figure 14:
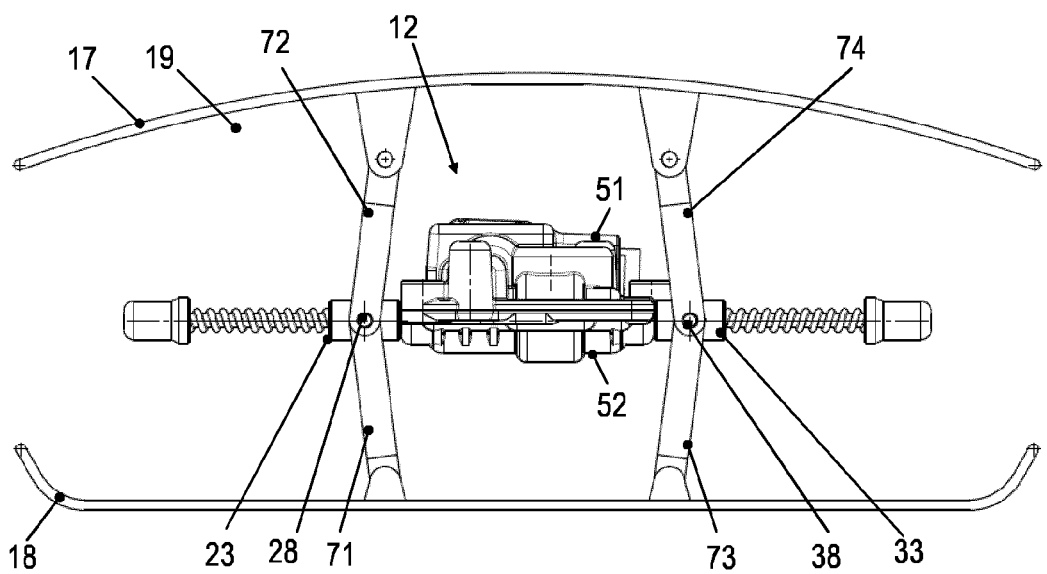

FIG. 12 to FIG. 14 illustrate a top view of a headrest system according to an embodiment. An actuator 12 is received in a cavity 19 between a front half shell 17 and a rear half shell 18 of the headrest. The actuator 12 is configured to displace the front half shell 17 of the headrest in a forward and rearward direction, i.e. to bring about an x-adjustment. The actuator 12 shown in FIG. 12 to FIG. 14 has the configuration of the actuator explained with reference to FIG. 9 to FIG. 11. However, the actuators of FIG. 3 to FIG. 8 may also be used.

The headrest system includes a first knee joint and a second knee joint. The first knee joint is coupled to the spindle nut 23 and the second knee joint is coupled to the second spindle nut 33. The first knee joint may include two first levers 71, 72, which are respectively pivotable about a pivot axis that is perpendicular to a longitudinal axis of the spindle 22. The two first levers 71, 72 may both be coupled to the first coupling portion 28 of the spindle nut 23. Additional first levers (not visible in FIG. 12 to FIG. 14) may be provided on the opposite side of the spindle nut 23. The first levers 71, 72 are pivoted when the spindle nut 23 is displaced along the spindle 22. The first knee joint with the first levers 71, 72 may also secure the first spindle nut 23 against rotation. The second knee joint may include two second levers 73, 74, which are respectively pivotable about a pivot axis that is perpendicular to a longitudinal axis of the spindle 22. The two second levers 73, 74 may both be coupled to the second coupling portion 38 of the second spindle nut 33. Additional second levers (not visible in FIG. 12 to FIG. 14) may be provided on the opposite side of the second spindle nut 33. The second levers 73, 74 are pivoted when the second spindle nut 33 is displaced along the spindle 22. The second knee joint with the second levers 73, 74 may also secure the second spindle nut 33 against rotation.

In operation, when the power drive of the actuator 12 is activated, the spindle nut 23 and the second spindle nut 33 are displaced along the spindle 22. This causes the levers of the knee joints to pivot, such that the first knee joint and the second knee joint are extended. The front half shell 17 of the headrest is displaced in the x-direction. The displacement continues until the spindle nut 23 and the second spindle nut 33 abut on end stops of the housing shells 51, 52, as shown in FIG. 14, and/or until the motor stops. The displacement may be reversed by reversing the rotation direction of the spindle 22, i.e. by reversing the rotation direction of the output shaft of the motor.

The headrest systems of embodiments may also be configured to adjust a shape of the headrest by displacing lateral portions of a front cover of the headrest and/or by otherwise adjusting the lateral support provided by a headrest.

Figure 15:
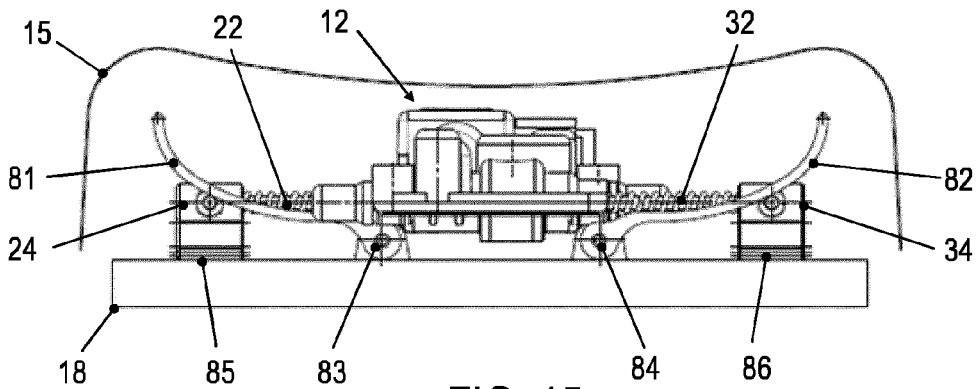
FIG. 15 and FIG. 16 are partially broken-away top views of a headrest system according to an embodiment for illustrating operation of an actuator.
Figure 16:
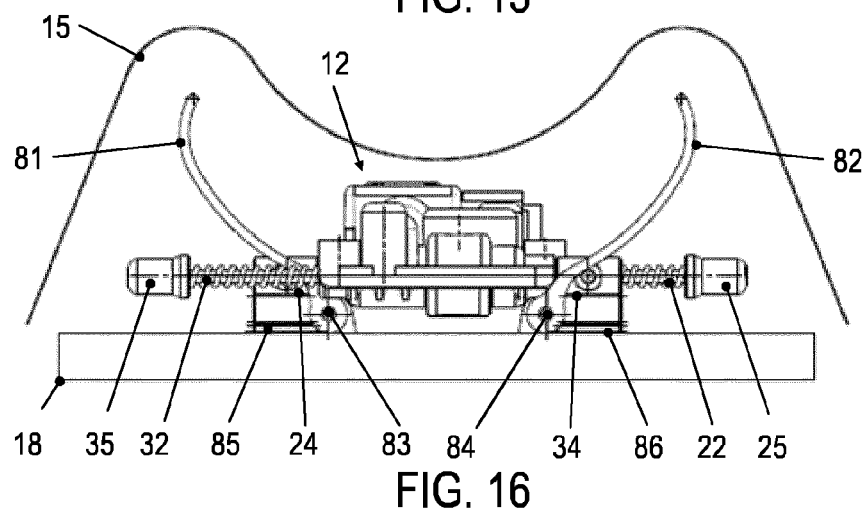
Figure 17:
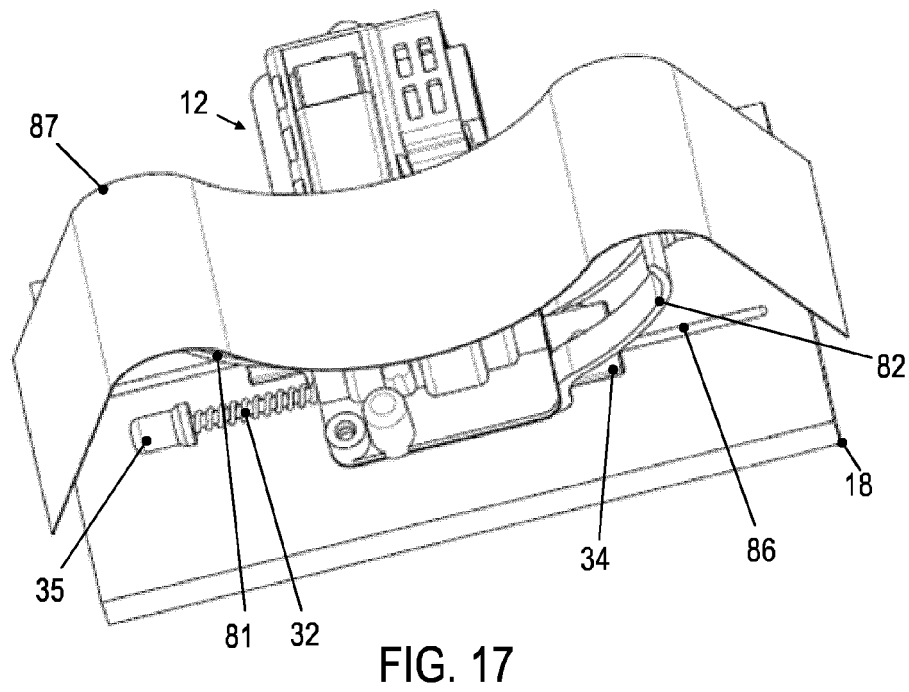
FIG. 17 is a partial perspective view of the headrest system of FIG. 15 and FIG. 16.

FIG. 15 and FIG. 16 illustrate a top view of a headrest system according to an embodiment, and FIG. 17 shows a partial perspective view of the headrest system. An actuator 12 is received in a cavity between a front panel of the cover 15 and a rear shell 18 of the headrest. The actuator 12 is configured to displace the lateral sides of the front of the headrest towards the front and, optionally, inward. Thereby, the shape of the front of the headrest is adjusted, because different locations on the front of the cover 15 are displaced to different degrees. The actuator 12 shown in FIG. 15 to FIG. 17 has the configuration of the actuator explained with reference to FIG. 3 to FIG. 5. However, the actuators of FIG. 6 to FIG. 11 may also be used.

The headrest system includes a first lever 81 and a second lever 82. The first lever 81 is coupled to the first coupling portion 24 of the spindle 22. The first lever 81 has a pivot axis 83 which may be transverse, in particular perpendicular, to the longitudinal axis of the spindle 22. The spindle 22 may be secured against rotation by abutment of the first lever 82 on the first coupling portion 24. Alternatively or additionally, a guide 85 may be formed for linear displacement of the first coupling portion 24, such that the spindle 22 cannot rotate about its longitudinal axis. The second lever 82 is coupled to the second coupling portion 34 of the second spindle 32. The second lever 82 has a pivot axis 84 which may be transverse, in particular perpendicular, to the longitudinal axis of the second spindle 32. The second spindle 32 may be secured against rotation by abutment of the second lever 82 on the second coupling portion 34. Alternatively or additionally, a guide 86 may be formed for linear displacement of the second coupling portion 34, such that the second spindle 32 cannot rotate about its longitudinal axis.

In operation, when the power drive of the actuator 12 is actuated, the spindle 22 and the second spindle 32 are displaced along their longitudinal axes. This causes the levers 81, 82 to pivot under the action of the first coupling portion 24 and second coupling portion 34, respectively, such that the first lever 81 and the second lever 82 are extended towards the front. The first lever 81 and the second lever 82 may be pivoted in a symmetrical manner relative to a center point. The first lever 81 and the second lever 82 may act directly or indirectly onto a front of the cover 15. For illustration, a reinforcement or padding member 87 may be provided to support the cover 15, and the first lever 81 and the second lever 82 may act onto the reinforcement or padding member 87. Deformation of the reinforcement or padding member 87 causes the front of the cover 15 to deform.

The first lever 81 and the second lever 82 may have curved shapes. The shape of the first lever 81 and of the second lever 82, along which the first and second coupling portions 24, 34 slide, defines the degree to which the shape of the cover 15 is adjusted and the adjustment rate. Various ways of acting onto the front of the cover 15 may be implemented using different linkages between the actuator 12 and the headrest.

Figure 18:
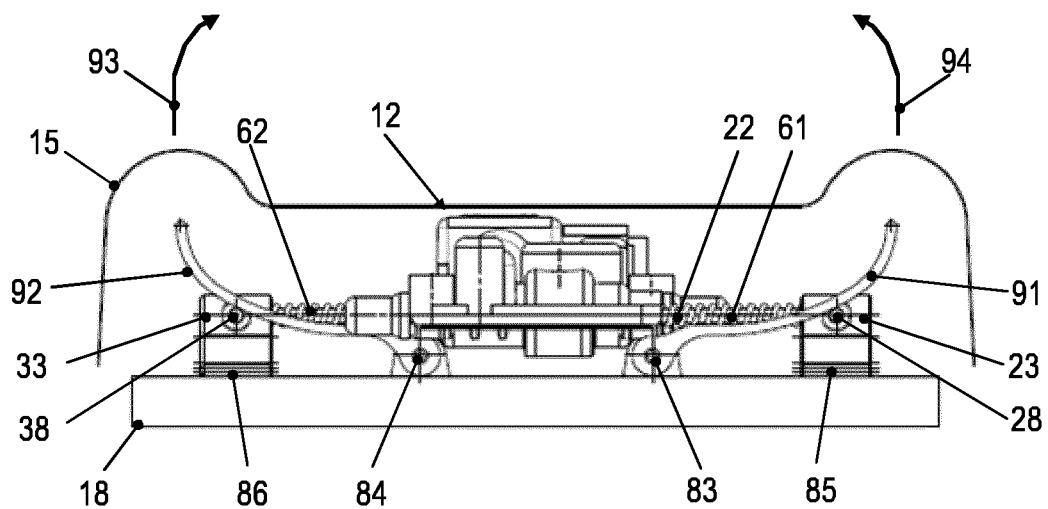
FIG. 18 is a partially broken-away top view of a headrest system according to an embodiment for illustrating operation of an actuator.
Figure 19:
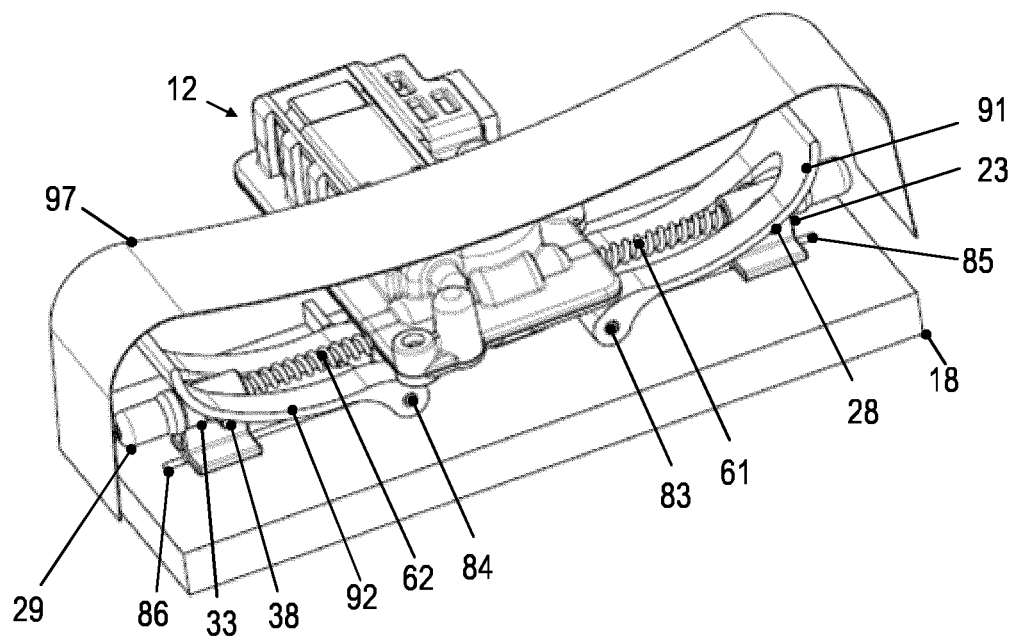
FIG. 19 is a partial perspective view of the headrest system of FIG. 18.

FIG. 18 illustrates a top view of a headrest system according to an embodiment, and FIG. 19 shows a partial perspective view of the headrest system. An actuator 12 is received in a cavity between a front panel of the cover 15 and a rear half shell 18 of the headrest. The actuator 12 is configured to displace the lateral sides of the front of the headrest first forward and then inwardly, e.g. along curves 93, 94. Thereby, different degrees of side bolster support are attained, the side bolster support on the headrest being adjusted by the actuator 12 which is received in a cavity of the headrest. The actuator 12 shown in FIG. 18 and FIG. 19 has the configuration of the actuator explained with reference to FIG. 9 to FIG. 11. However, the actuators of FIG. 3 to FIG. 8 may also be used.

The headrest system includes a first lever 91 and a second lever 92. The shapes of the first and second levers 91, 92 may be the same or different from the shapes of the first and second levers 81, 82 of FIG. 15 to FIG. 17, depending on the adjustment which is desired. The first lever 91 is coupled to the first coupling portion 28 of the spindle nut 23. The first lever 91 has a pivot axis 83 which may be transverse, in particular perpendicular, to the longitudinal axis of the spindle 22. The spindle nut 23 may be secured against rotation by abutment of the first lever 91 on the first coupling portion 28. Alternatively or additionally, a guide 85 may be formed for linear displacement of the first coupling portion 28, such that the spindle nut 23 cannot rotate about its longitudinal axis. The second lever 92 is coupled to the second coupling portion 38 of the second spindle nut 33. The second lever 92 has a pivot axis 84 which may be transverse, in particular perpendicular, to the longitudinal axis of the spindle 22. The second spindle nut 33 may be secured against rotation by abutment of the second lever 92 on the second coupling portion 38. Alternatively or additionally, a guide 86 may be formed for linear displacement of the second coupling portion 38, such that the spindle 22 cannot rotate about its longitudinal axis.

In operation, when the power drive of the actuator 12 is activated, the spindle nut 23 and the second spindle nut 33 are displaced along the longitudinal axis of the spindle 22. This causes the levers 91, 92 to pivot under the action of the first coupling portion 28 and second coupling portion 38, respectively, such that the first lever 91 and the second lever 92 are extended towards the front. The first lever 91 and the second lever 92 may be pivoted in a symmetrical manner. The first lever 91 and the second lever 92 may act directly or indirectly onto a front portion of the cover 15. For illustration, a reinforcement or padding member 97 may be provided to support the cover 15, and the first lever 91 and the second lever 92 may act onto the reinforcement or padding member 97. Deformation of the reinforcement or padding member 97 causes the front of the cover 15 to deform.

In other embodiments, the headrest system may be configured such that a pivot axis of a pivotable lever is displaced. The pivot axis may be displaced in a direction which is parallel to a longitudinal axis of a spindle of an actuator housing in a cavity of the headrest. The pivot axis may be displaced in a direction which is transverse to a direction in which at least a portion of the headrest is adjusted.

Figure 20:
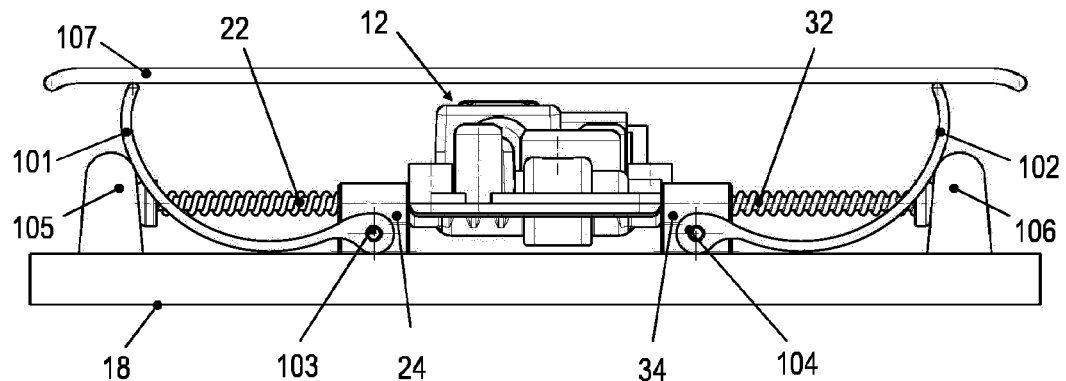
FIG. 20 and FIG. 21 are partially broken-away top views of a headrest system according to another embodiment for illustrating operation of an actuator.
Figure 21:
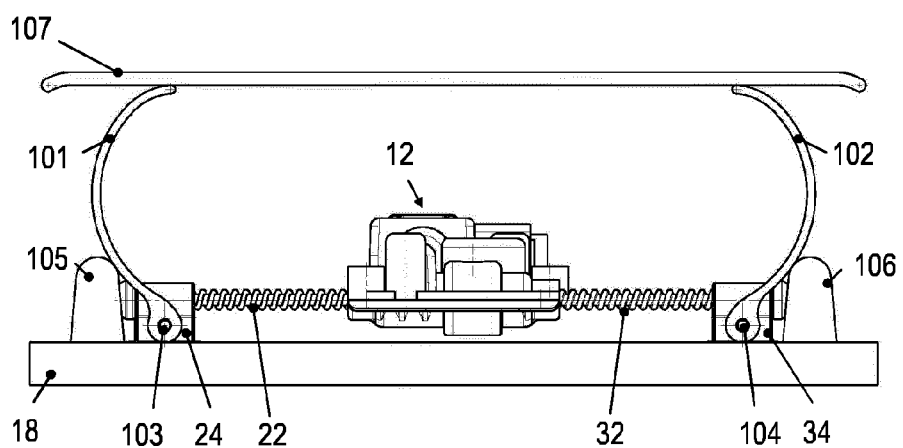
Figure 22:
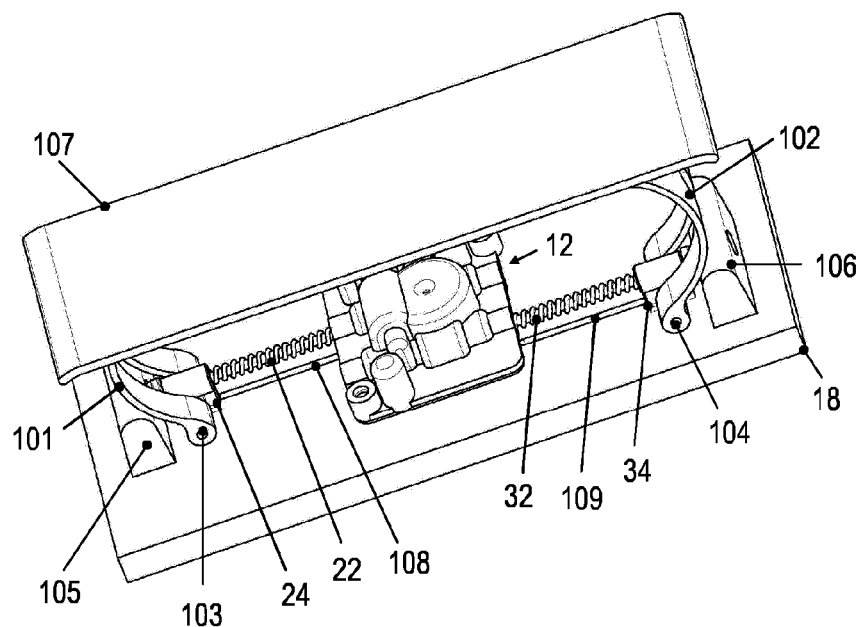
FIG. 22 is a partial perspective view of the headrest system of FIG. 20 and FIG. 21.

FIG. 20 and FIG. 21 illustrate a top view of a headrest system according to an embodiment, and FIG. 22 shows a partial perspective view of the headrest system. An actuator 12 is received in a cavity between a front panel of the cover 15 and a rear shell 18 of the headrest. The actuator 12 is configured to displace a member 107 in a forward or rearward direction. Optionally, the actuator 12 may also be configured to adjust a shape of the front of the headrest. The actuator 12 shown in FIG. 20 to FIG. 22 has the configuration of the actuator explained with reference to FIG. 3 to FIG. 5. However, the actuators of FIG. 6 to FIG. 11 may also be used.

The headrest system includes a first lever 101 and a second lever 102. The first lever 101 is coupled to a first coupling portion 24 of the spindle 22. The first lever 101 has a pivot axis 103 which may be transverse, in particular perpendicular, to the longitudinal axis of the spindle 22. The spindle 22 may be secured against rotation by engagement between the first coupling portion 24 and a mating engagement feature formed on the rear shell 18. A guide 108 may be formed for linear displacement of the first coupling portion 24, such that the spindle 22 cannot rotate about its longitudinal axis.

The first coupling portion 24 may be formed on the spindle 22. The first coupling portion 24 may be formed on the spindle 22 in a torque proof manner. The first coupling portion 24 may be molded on the spindle 22, e.g., by overmolding a plastic material onto the spindle 22. The first coupling portion 24 forms the pivot axis 103 for the first lever 101.

The first lever 101 abuts on a shoulder 105. The shoulder 105 may be formed on a shell of the housing. The shoulder 105 may have a fixed location, e.g. relative to the rear shell 18.

The second lever 102 is coupled to a second coupling portion 34 of the second spindle 32. The second lever 102 has a pivot axis 104 which may be transverse, in particular perpendicular, to the longitudinal axis of the second spindle 32. The second spindle 32 may be secured against rotation by engagement between the second coupling portion 34 and a mating engagement feature formed on the rear shell 18. A guide 109 may be formed for linear displacement of the second coupling portion 34, such that the spindle 32 cannot rotate about its longitudinal axis.

The second coupling portion 34 may be formed on the second spindle 32. The second coupling portion 34 may be formed on the second spindle 32 in a torque proof manner. The second coupling portion 34 may be molded on the second spindle 32, e.g., by overmolding a plastic material onto the spindle 32. The second coupling portion 34 forms the pivot axis 104 for the second lever 102.

The second lever 102 abuts on a second shoulder 106. The second shoulder 106 may be formed on a shell of the housing. The second shoulder 106 may have a fixed location, e.g. relative to the rear shell 18.

In operation, when the power drive of the actuator 12 is actuated, the spindle 22 and the second spindle 32 are displaced along their longitudinal axes. This causes the pivot axis 103 of the first lever 101 to be displaced relative to the first shoulder 105 and the pivot axis 104 of the second lever 102 to be displaced relative to the second shoulder 106. The first pivot axis 103 of the first lever 101 is displaced in a direction which is transverse to the direction in which the headrest is adjusted. The second pivot axis 103 of the second lever 102 is displaced in a direction which is transverse to the direction in which the headrest is adjusted. The first pivot axis 103 and the second pivot axis 104 are displaced in opposite directions, i.e., away from each other or towards each other. The first pivot axis 103 and the second pivot axis 104 may be displaced in a left-right direction, while at least a portion of the headrest may be adjusted in a forward-rearward direction.

When the power drive of the actuator 12 is actuated, the levers 101, 102 pivot under the action of the first coupling portion 24 and second coupling portion 34, respectively, such that the first lever 101 and the second lever 102 are extended towards the front. The first lever 101 and the second lever 102 may be pivoted in a symmetrical manner relative to a center point. The first lever 101 and the second lever 102 may act directly or indirectly onto a front of the cover 15. For illustration, a reinforcement or padding member 107 may be provided to support the cover 15, and the first lever 101 and the second lever 102 may act onto the reinforcement or padding member 107. Deformation of the reinforcement or padding member 107 may cause the front of the cover 15 to deform.

The first lever 101 and the second lever 102 may have curved shapes. The shape of the first lever 101 and of the second lever 102, which slide along the shoulder 105 and the second shoulder 106, respectively, define the movement path of the member 107 and the adjustment rate. Various ways of acting onto the front of the cover 15 may be implemented using different linkages between the actuator 12 and the headrest.

Figure 23:
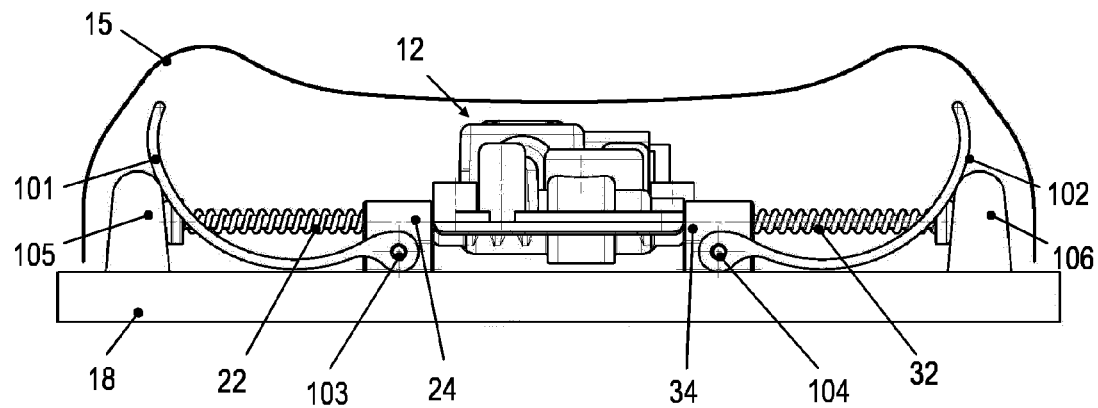
FIG. 23 and FIG. 24 are partially broken-away top views of a headrest system according to another embodiment for illustrating operation of an actuator.
Figure 24:
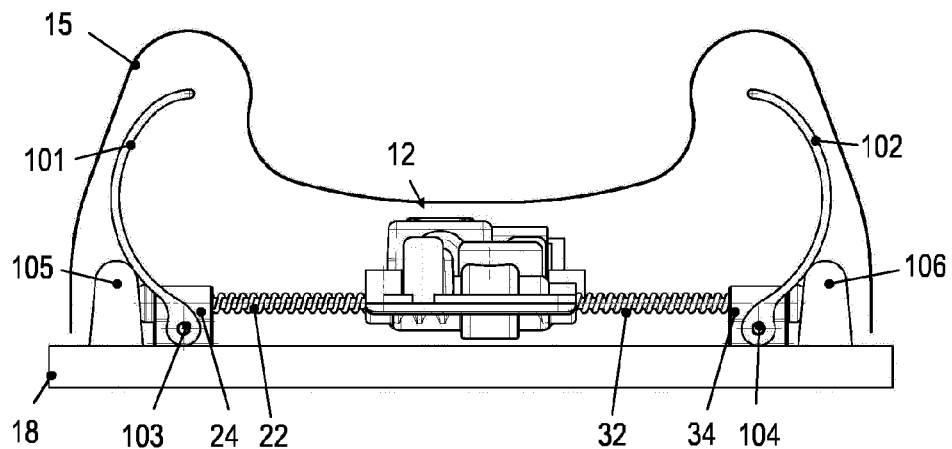
Figure 25:
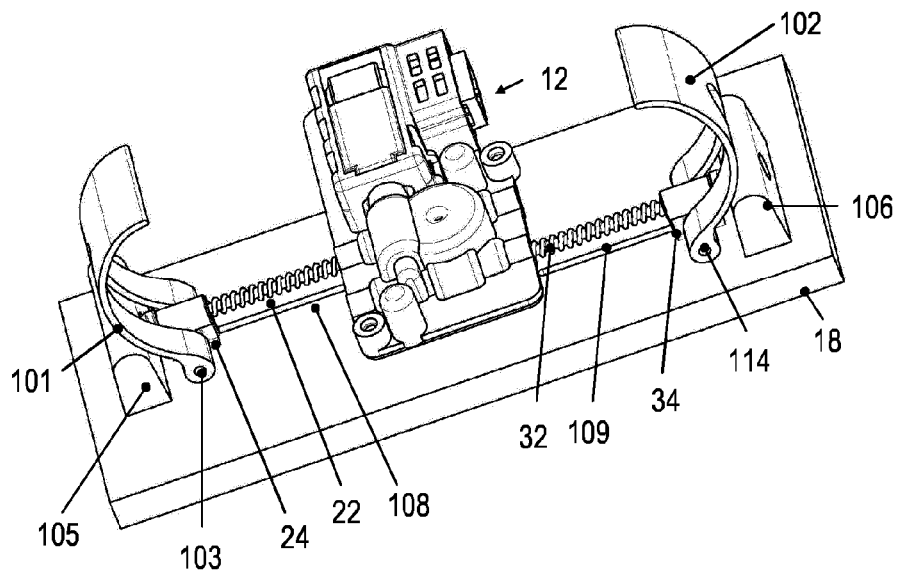
FIG. 25 is a partial perspective view of the headrest system of FIG. 23 and FIG. 24.

FIG. 23 and FIG. 24 illustrate a top view of a headrest system according to an embodiment, and FIG. 25 shows a partial perspective view of the headrest system. An actuator 12 is received in a cavity between a front panel of the cover 15 and a rear shell 18 of the headrest.

The configuration and operation of the headrest system of FIG. 23 to FIG. 25 is generally similar to the headrest system of FIG. 20 to FIG. 22. In particular, the headrest system is configured such that actuation of a power drive of the actuator 12 causes a pivot axis 103 of a first lever 101 and a pivot axis 104 of a second lever 102 to be displaced in a direction parallel to the longitudinal axis of the spindle 22 and parallel to the longitudinal axis of the second spindle 32.

In the headrest system of FIG. 23 to FIG. 25, the actuator 12 is configured to displace the lateral sides of a front panel of the headrest cover 15 towards the front and, optionally, inward. Thereby, the shape of the front of the headrest is adjusted, because different locations on the front of the cover 15 are displaced to different degrees.

The first lever 101 and the second lever 102 may have curved shapes. The shape of the first lever 101 and of the second lever 102, which slide along the shoulder 105 and the second shoulder 106, respectively, defines the degree to which the shape of the cover 15 is adjusted and the adjustment rate. Various ways of acting onto the front of the cover 15 may be implemented using different linkages between the actuator 12 and the headrest. A reinforcement or padding member may be interposed between the first lever 101 and at least a portion of the cover 15 and/or between the second lever 102 and at least a portion of the cover 15.

With headrest systems and actuators as explained with reference to FIG. 1 to FIG. 25, portions of a headrest or the headrest as a whole can be adjusted relative to a bracket which mounts the headrest to a seat. At least a portion of the headrest is displaced in a displacement direction transverse to the longitudinal member of the bracket, to thereby effect an adjustment in x-direction (forward-rearward direction) or in a horizontal plane. By reversing the rotation direction of the motor, the adjustment direction may be reversed. For illustration, the front of the headrest may be displaced in a forward direction when the output shaft of the motor rotates in a first direction and in a rearward direction when the output shaft of the motor rotates in the opposite second direction. The curvature of the headrest front may be increased when the output shaft of the motor rotates in a first direction and may be decreased when the output shaft of the motor rotates in the opposite second direction.

The headrest may include a plurality of separate components which can be adjusted in the x-direction using an actuator of an embodiment. For illustration, the front half shell 17 of the headrest may be segmented into at least two segments which may respectively be adjusted relative to the rear half shell 18 under action of the actuator 12 of an embodiment. In still other implementations, the headrest as a whole can be adjusted relative to the bracket, without altering its external dimensions. The actuator may be mounted to the bracket or to the headrest and may effect a relative displacement of the headrest relative to the bracket in the x-direction. An arrangement similar to the one explained with reference to FIG. 12 to FIG. 14 may be used for this purpose, with the knee joints being coupled to the bracket on one end and the headrest on the other end. By extending the knee joints under action of the actuator, the headrest is displaced relative to the bracket in the forward or rearward direction.

The headrest systems according to various embodiments may additionally be configured such that the headrest can also be adjusted along the longitudinal member 13 of the bracket. The bracket may serve as guide bracket for height adjustment of the headrest. For providing height adjustment, yet another spindle transmission which includes a spindle and a spindle nut may be used. The spindle used for height adjustment may extend transverse to the spindle(s) used for x-adjustment. A separate actuator may be mounted in the cavity of the headrest to provide height adjustment.

In all embodiments, actuation of the motor(s) may be controlled by an electric controller, as explained with reference to FIG. 1.

In all embodiments, the spindle and, if present, the second spindle may be a flexible shaft or flex-shaft which is provided with an external thread. The flexible shaft may have a metal core comprising one metal wire or a plurality of metal wires.

The flexible shaft may have an external thread. The flexible shaft may have a metal wire helix on its outer surface for forming the external thread. The spindle and, if present, the second spindle may also be rigid.

According to embodiments, an adjustment of a headrest in the forward-rearward direction and/or the lateral direction can be realized using an actuator which is housed within the headrest. The actuator may have a speed reduction mechanism with at least two speed reductions stages, e.g. a first worm transmission and a second worm transmission. The rotational movement is converted into a linear movement using a spindle transmission, which may form a third gear stage of the actuator.

While embodiments of the invention have been described with reference to the drawings, various modifications may be implemented in further embodiments. For illustration, while an actuator has been described in which a two-stage worm transmission is coupled between the rotary output shaft of an electric motor and a spindle transmission, in other embodiments the drive mechanism may comprise only one or at least three worm transmission stages. In other embodiments, another speed reduction mechanism may be provided.

In each one of the various embodiments, the linear movement provided by the spindle transmission can be converted into the adjustment movement of the headrest or components thereof with various solutions, like knee joint or lever transmission, without being limited thereto. The actuator may be mounted on various locations of the headrest system. For illustration, the actuator may be mounted so as to be moveable on a lever system, may be fixed at the headrest shells with clips, rivets or other known mounts, or may be fixed to the bracket which attaches the headrest to the seat.

The adjustment mechanism of embodiments may also be combined with other mechanisms which are located outside the headrest cavity. For illustration, the headrest systems of embodiments may be combined with mechanisms for pivoting the headrest forward, e.g. for safety reasons in an accident, or rearward. The latter mechanisms may have triggers which still reside in the backrest of the seat.

It will be appreciated that various technical effects can be attained using the headrest systems and methods of embodiments. The actuator has a compact construction, which allows it to be integrated into the internal cavity of the headrest. The speed reduction mechanism allows compact electric motors to be used. A low weight and inexpensive construction may be realized.

The headrest systems of some embodiments provide a modular construction which allows the adjustable headrest to be easily integrated with a conventional backrest. The actuator can be easily adapted to various adjustment speeds and adjustment forces. For illustration, the speed reduction mechanism between the output shaft of the motor and the spindle transmission may be adjusted depending on customer needs. Alternatively or additionally, the adjustment travel may be adapted. This can be done easily by suitably positioning the end stops on the spindle(s) of the actuator.

While exemplary embodiments have been described in the context of an x-direction adjustment of a headrest of a vehicle seat, embodiments of the invention are not limited to this particular field of application. Rather, embodiments of the invention may be advantageously employed to adjust headrests in a wide variety of seats.

What is claimed is:

1. A headrest system comprising:
    a headrest;
    a bracket having a longitudinal member for mounting the headrest to a seat; and
    an actuator configured to displace at least a portion of the headrest relative to the bracket in a displacement direction,
    wherein the actuator comprises a first spindle transmission and a power drive coupled to the first spindle transmission, the first spindle transmission including a spindle and a first spindle nut engaged with the spindle, the power drive arranged in a cavity defined within an outer shell of the headrest, the first spindle nut arranged within the cavity, and the spindle arranged within the cavity such that a longitudinal axis of the spindle is orthogonal to the displacement direction, and
    wherein the actuator further comprises a second spindle transmission, the second spindle transmission including a second spindle nut.

2. The headrest system according to claim 1, wherein the actuator comprises a worm, and wherein both the first spindle transmission and the second spindle transmission are coupled to the worm.

3. The headrest system according to claim 1, further comprising
    a first actuation member coupled to a first coupling portion of the first spindle transmission, and
    a second actuation member coupled to a second coupling portion of the second spindle transmission, the actuator configured such that a first displacement of the first coupling portion and a second displacement of the second coupling portion have equal magnitudes and opposite directions.

4. The headrest system of claim 3, wherein the first actuation member and the second actuation member include at least one lever which is pivotably mounted.

5. The headrest system of claim 4, wherein a pivot axis of a first lever of the at least one lever is provided on the first coupling portion of the first spindle transmission.

6. The headrest system according to claim 1, wherein the spindle is mounted so as to rotate upon actuation of the power drive.

7. The headrest system according to claim 1, wherein the first spindle nut and the second spindle nut are mounted so as to rotate upon actuation of the power drive.

8. The headrest system according to claim 1, wherein the spindle is a first spindle, and wherein the actuator comprises a second spindle, the second spindle nut being engaged with the second spindle.

9. The headrest system according to claim 8, wherein an external thread of the first spindle and an external thread of the second spindle have equal pitch and equal helicity.

10. The headrest system according to claim 1, wherein the first spindle nut is engaged with a first portion of the spindle which has a first external thread having a first helicity, and the second spindle nut is engaged with a second portion of the spindle which has a second external thread having a second helicity opposite to the first helicity.

11. A seat comprising:
    a backrest; and
    a headrest system according to claim 1, wherein the bracket of the headrest system is attached to the backrest.

12. A headrest system comprising:
    a headrest;
    a bracket having a longitudinal member for mounting the headrest to a seat; and an actuator configured to displace at least a portion of the headrest relative to the bracket in a displacement direction arranged at an angle relative to the longitudinal member, wherein the actuator comprises a spindle transmission and a power drive coupled to the spindle transmission, the spindle transmission including a spindle and a spindle nut engaged with the spindle, the power drive arranged in a cavity defined within an outer shell of the headrest, wherein the power drive includes a motor, and wherein the actuator has a two-stage worm transmission coupled between the motor and the spindle transmission.

13. A method of adjusting a headrest mounted to a seat via a bracket, the bracket having a longitudinal member, the method comprising:

activating a power drive arranged in a cavity defined within an outer shell of the headrest to drive a spindle transmission through a two-stage worm transmission coupled between a motor of the power drive and the spindle transmission, the spindle transmission including a spindle and a spindle nut engaged with the spindle, wherein the spindle transmission displaces at least a portion of the headrest relative to the bracket in a displacement direction which is arranged at an angle relative to the longitudinal member.

14. A method of adjusting a headrest mounted to a seat via a bracket, the bracket having a longitudinal member, the method comprising:

activating a power drive arranged in a cavity defined within an outer shell of the headrest to drive a first spindle transmission and a second spindle transmission, the first spindle transmission including a spindle and a first spindle nut engaged with the spindle, the second spindle transmission including a second spindle nut, wherein the first spindle transmission displaces at least a portion of the headrest relative to the bracket in a displacement direction, the spindle arranged within the cavity such that a longitudinal axis of the spindle is orthogonal to the displacement direction.

15. A headrest system comprising:

a headrest;

a bracket having a longitudinal member for mounting the headrest to a seat; and an actuator configured to displace at least a portion of the headrest relative to the bracket in a displacement direction, wherein the actuator comprises a spindle transmission and a power drive coupled to the spindle transmission, the power drive comprising at least one speed reduction stage, the spindle transmission including a spindle and a spindle nut engaged with the spindle, the spindle arranged within a cavity defined within an outer shell of the headrest such that a longitudinal axis of the spindle is orthogonal to the displacement direction, the spindle nut arranged within the cavity, the spindle having an external helical thread and the spindle nut having an internal helical thread engaged with the external helical thread of the spindle.

* * * * *